(12) United States Patent
Gramlich et al.

(10) Patent No.: US 11,848,112 B2
(45) Date of Patent: Dec. 19, 2023

(54) REACTOR DESIGN WITH CONTROLLED THERMAL NEUTRON FLUX FOR ENHANCED NEUTRON ACTIVATION POTENTIAL

(71) Applicant: BWXT Advanced Technologies LLC, Lynchburg, VA (US)

(72) Inventors: Craig D. Gramlich, Forest, VA (US); William E. Russell, II, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 204 days.

(21) Appl. No.: 17/169,679

(22) Filed: Feb. 8, 2021

(65) Prior Publication Data

US 2021/0319920 A1  Oct. 14, 2021

Related U.S. Application Data

(60) Provisional application No. 62/976,589, filed on Feb. 14, 2020.

(51) Int. Cl.
*G21C 5/02* (2006.01)
*G21C 5/06* (2006.01)
(Continued)

(52) U.S. Cl.
CPC .................. *G21C 5/02* (2013.01); *G21C 5/06* (2013.01); *G21C 5/10* (2013.01); *G21C 23/00* (2013.01);
(Continued)

(58) Field of Classification Search
CPC ... G21C 5/02; G21C 5/06; G21C 5/10; G21C 3/30; G21C 3/32; G21C 11/06
See application file for complete search history.

(56) References Cited

U.S. PATENT DOCUMENTS 2,991,601 A   7/1961   Glatter et al.
3,070,527 A   12/1962  Hurford et al.
(Continued)

FOREIGN PATENT DOCUMENTS

GB       1218764 A  *  1/1971  ............. G21C 3/328

OTHER PUBLICATIONS

Xoubi et al., "Modeling of the High Flux Isotope Reactor Cycle 400", Oak Ridge National Laboratory, ORNL/TM-2004/251 (Aug. 2005), 63 pages.
(Continued)

*Primary Examiner* — Sharon M Davis
(74) *Attorney, Agent, or Firm* — Morgan, Lewis & Bockius LLP

(57) ABSTRACT

Reactor core and thermal neutron fission reactor has fuel rods with a composite fuel composition (each having the same uniform cross-section along their axial length), end plates at first and second ends, and intermediate support plates located along a longitudinal length of the reactor core. In a radial cross-section, the fuel rods are arranged at nodes of a hexagonal pitch arrangement, in which the nodes are in a spaced-apart arrangement and interconnected by ligaments. Openings between the nodes form part of a coolant flow path through the thermal neutron reactor core. At least two of the nodes of the hexagonal pitch arrangement are sized to allow insertion, translation, removal, or a combination thereof of auxiliary equipment, such as a target delivery system (TDS) for isotopes. Thermal neutron flux (neutrons ≤0.06 eV) is maximized for maximum neutron activation potential, which is applied to produce both commercial and research isotopes.

21 Claims, 15 Drawing Sheets

(51) Int. Cl.
  *G21C 5/10*   (2006.01)
  *G21C 23/00*  (2006.01)
  *G21G 1/02*   (2006.01)
  *G21C 11/06*      (2006.01)
  *G21C 7/08*       (2006.01)
  *G21C 3/16*       (2006.01)

(52) U.S. Cl.
  CPC ............... *G21G 1/02* (2013.01); *G21C 3/16* (2013.01); *G21C 7/08* (2013.01); *G21C 11/06* (2013.01)

(56) References Cited

U.S. PATENT DOCUMENTS

| | | |
|---|---|---|
| 3,081,249 A | 3/1963 | Whittemore, Jr. |
| 3,719,559 A | 3/1973 | Bass |
| 4,357,298 A | 11/1982 | Wolters, Jr. et al. |
| 4,690,716 A | 9/1987 | Sabol et al. |
| 2010/0172460 A1 | 7/2010 | Yoon et al. |
| 2018/0244535 A1 | 8/2018 | Russell, II et al. |
| 2018/0244536 A1 | 8/2018 | Russell, II et al. |
| 2018/0322973 A1 | 11/2018 | Fisher et al. |
| 2020/0027618 A1 | 1/2020 | Onderwater et al. |
| 2020/0075180 A1 | 3/2020 | Onderwater et al. |
| 2020/0090824 A1 | 3/2020 | Onderwater et al. |

OTHER PUBLICATIONS

High Flux Isotope Reactor (HFIR) User Guide, Revision 2.0, Oack Ridge National Laboratory (Nov. 2015), 47 pages.
International Search Report and Written Opinion dated Apr. 28, 2021 in International Application No. PCT/US21/17161.

* cited by examiner

FIG. 3A  FIG. 3C

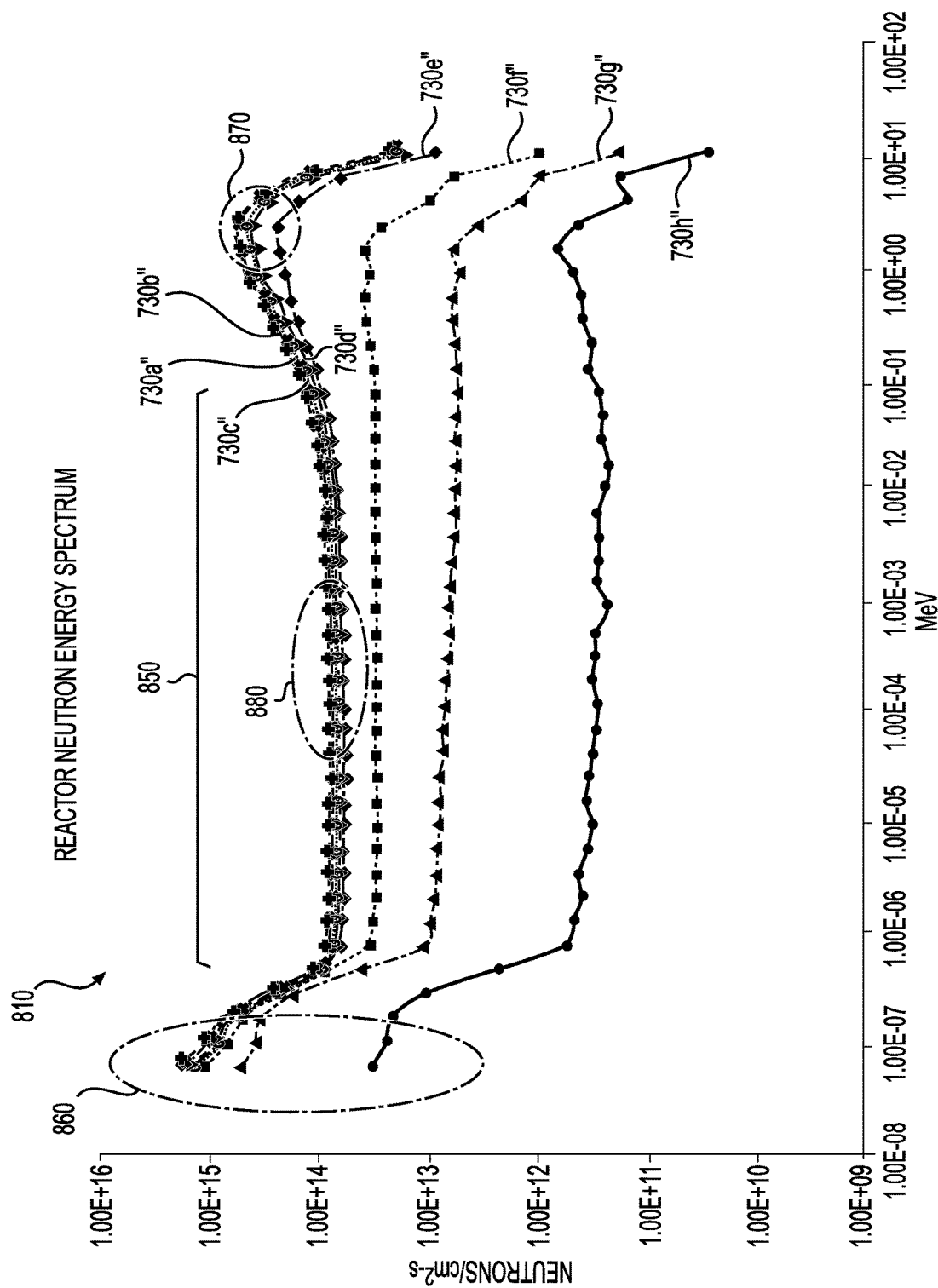

REACTOR DESIGN WITH CONTROLLED THERMAL NEUTRON FLUX FOR ENHANCED NEUTRON ACTIVATION POTENTIAL

RELATED APPLICATION DATA

This application is based on and claims priority under 35 U.S.C. § 119 to U.S. Provisional Application No. 62/976,589, filed Feb. 14, 2020, the entire contents of which are incorporated herein by reference.

TECHNICAL FIELD AND INDUSTRIAL APPLICABILITY

The disclosure relates generally to a fission reactor and, in some embodiments, to a high flux thermal neutron fission reactor for irradiating materials, which can be used to create, for example, radioisotopes. In particular, the disclosure relates to a fission reactor in which each fuel rod of the plurality of fuel rods is identical, which allows for positional interchangeability of the fuel rods. Additionally, in a plane perpendicular to a longitudinally extending central axis of the reactor core, the plurality of fuel rods are arranged at nodes of a hexagonal pitch arrangement. The nodes are in a spaced-apart arrangement, with ligaments connecting the nodes. Openings (for example, to accommodate coolant flow) are adjacent the ligaments. Furthermore, at least two of the nodes of the hexagonal pitch arrangement do not accommodate fuel rods, but rather are sized to allow insertion, translation, and removal of auxiliary equipment, such as a control rod or a target delivery system (TDS) for isotope production.

Although this disclosure references and provides examples using a water-moderated, thermal fission reactor, the principles, compositions, structures, features, arrangements and processes described herein can apply to and be embodied in other thermal fission reactors using other moderators (such as graphite and lithium and beryllium elements) and other coolants (such as liquid metal, molten salts, and gas).

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Many nuclear reactors are used for research and training, materials testing, or the production of radioisotopes for medicine and industry. Most of these reactors operate under the premise that thermal (slow) neutrons allow for increased isotopic activation events.

A common design for thermal neutron research reactor is a light water-type reactor, where the core is a cluster of fuel elements sitting in a large pool of flowing water to remove heat. Among the fuel elements are control rods and empty channels for experiments. Each fuel element comprises several curved aluminum-clad fuel plates in a tangential array. The water both moderates and cools the reactor, and graphite or beryllium is generally used for the reflector, although other materials may also be used. Apertures to access the neutron beams are set in the wall of the pool. Other designs are moderated by heavy water or graphite.

Adjustments to the overall size, fuel enrichment, fuel density, power, and structural material neutron cross sections can maximize the thermal neutron flux for any specific suite of materials.

One specific example of a research reactor is the high flux isotope reactor ("HFIR") located at Oak Ridge National Laboratory. The HFIR is a beryllium-reflected, light-water-cooled and -moderated, flux-trap type reactor that uses highly enriched uranium-235 as the fuel. The fuel plates are curved in the shape of an involute and provide a constant coolant channel width between the curved fuel plates. The fuel (a $U_3O_8$—Al cermet) is non-uniformly distributed along the arc of the involute to lower radial power peaking and hot spots. The fuel region is surrounded by a concentric ring of beryllium reflector. Control plates, in the form of two thin, neutron poison infused concentric cylinders, are located in an annular region between the reactor core and the beryllium reflector. These control plates are driven in opposite directions to open and close a window at the core mid-plane and their movement controls the power regulation and shutdown of the reactor.

Despite the existence of various research reactors producing thermal neutrons for research, industrial, and medicinal purposes, there is still room for improved designs of fission reactors capable of generating high flux thermal neutrons.

SUMMARY

In general, the disclosure relates to a thermal neutron fission reactor that utilizes simplified manufacturing techniques while maximizing thermal neutron flux with moderating materials (e.g. light water, beryllium) that convert fast (high energy) neutrons to thermal neutrons by lowering their energy level. The term thermal neutrons as used herein designates neutrons with energy levels equal to or less than 0.06 eV ($E_{n_{thermal}} \leq 0.06$ eV). Uniform fuel rods include pelletized fuel forms based on a beryllium oxide and uranium dioxide matrix optimized for longevity and thermal flux within a seamless tube of aluminum-based cladding. Specific hexagonal-pitch locations within the reactor core are sized to allow translation of a control rod or to allow insertion and removal of a target delivery system for isotopes (or other isotope harvesting equipment).

Embodiments of a reactor core of a thermal neutron fission reactor includes a plurality of fuel rods, a first end plate located at a first longitudinal end of the reactor core, a second end plate located at a second longitudinal end of the reactor core, a plurality of intermediate support plates located along a longitudinal length of the reactor core between the first longitudinal end and the second longitudinal end. Each fuel rod includes a composite fuel composition enclosed within a primary containment barrier, wherein the primary containment barrier comprises a seamless cladding tube, a first end cap, and a second end cap. The first end plate includes a plurality of openings extending across a thickness of the first end plate from a first side to a second side of the first end plate, wherein each of the plurality of fuel rods is attached to the first end plate by a first interfacing structure. The second end plate including a plurality of openings extending across a thickness of the second end plate from a first side to a second side of the second end plate, wherein each of the plurality of fuel rods is attached to the second end plate by a second interfacing structure. Each intermediate support plate including a plurality of openings extending across a thickness of the respective intermediate support plate from a first side to a second side of the respective intermediate support plate, wherein each of the plurality of fuel rods is attached to each intermediate support plate. In a plane perpendicular to a longitudinally extending central axis of the reactor core, the plurality of fuel rods are arranged at nodes of a hexagonal pitch arrangement, wherein the nodes are in a spaced-apart arrangement with the openings between the nodes, the openings forming part of a flow path through the reactor core extending from the first end plate to the second end plate, and wherein at least two of the nodes of the hexagonal pitch arrangement are sized to allow insertion, translation, removal, or a combination thereof of auxiliary equipment.

The thermal neutron reactor core can be assembled by methods that include (i) assembling a plurality of fuel rods, each fuel rod including a composite fuel composition enclosed within a primary containment barrier, wherein the primary containment barrier comprises a seamless cladding tube, a first end cap at a first longitudinal end of the fuel rods, and a second end cap at a second longitudinal end of the fuel rods; (ii) distributing a plurality of intermediate support plates along a longitudinal length of the plurality of fuel rods between the first longitudinal end and the second longitudinal end and attaching each of the plurality of fuel rods to each intermediate support plate, wherein the intermediate support plate includes a plurality of openings extending across a thickness of the respective intermediate support plate from a first side to a second side of the respective intermediate support plate, and wherein, in a plane perpendicular to a longitudinally extending central axis of the reactor core, the plurality of fuel rods are located at nodes of a hexagonal pitch arrangement; (iii) attaching each of the plurality of fuel rods to a first end plate located at the first longitudinal end of the reactor core, the first end plate including a plurality of openings extending across a thickness of the respective intermediate support plate from a first side to a second side of the first end plate, wherein each of the plurality of fuel rods is attached to the first end plate by a first interfacing structure; and (iv) attaching each of the plurality of fuel rods to a second end plate located at the second longitudinal end of the reactor core, the second end plate including a plurality of openings extending across a thickness of the respective intermediate support plate from a first side to a second side of the second end plate, wherein each of the plurality of fuel rods is attached to the second end plate by a second interfacing structure, wherein the nodes are in a spaced-apart arrangement with the openings between the nodes, the openings forming part of a flow path through the reactor core extending from the first end plate to the second end plate, and wherein at least two of the nodes of the hexagonal pitch arrangement are sized to allow insertion, translation, removal, or a combination thereof of auxiliary equipment.

Embodiments of the thermal neutron reactor core can be incorporated into a thermal neutron fission reactor. In exemplary embodiments, the thermal neutron reactor core includes a pressure vessel defining an interior volume, an active core region located within the interior volume of the pressure vessel, the active core region including the thermal neutron reactor core and a reflector, wherein relative to the longitudinally extending central axis of the thermal neutron reactor core, the reflector is radially outward of the thermal neutron reactor core, a plurality of control rods insertable in the nodes of the hexagonal pitch arrangement sized to allow translation of the control rod, at least one target delivery system for isotopes, the at least one target delivery system for isotopes insertable into and removable from the nodes of the hexagonal pitch arrangement sized to allow insertion and removal of the target delivery system for isotopes, wherein the pressure vessel includes sealable openings positioned to provide access to the target delivery system.

In some embodiments, the thermal neutron reactor core further comprises at least one target delivery system for isotopes, the at least one target delivery system for isotopes insertable into and removable from the nodes of the hexagonal pitch arrangement sized to allow insertion and removal of the target delivery system for isotopes.

Radioisotope production in reactors is based on neutron capture in a target material, either by activation or generation of radioisotopes from fission of the target material by bombardment with thermal neutrons, and radioisotopes can be prepared using the disclosed thermal neutron reactor core by a method that includes placing a volume of material into one of the target delivery system for isotopes of the thermal neutron fission reactor, inserting the target delivery system for isotopes into one of the nodes of the hexagonal pitch arrangement sized to allow insertion and removal of the target delivery system for isotopes, irradiating the target delivery system for isotopes with radiation from the thermal neutron fission reactor, and recovering the irradiated volume of material.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIG. 3A shows a schematic, perspective view of an assembled fuel rod and FIGS. 3B and 3C show magnified section views of end portions P2, P3 of the assembled fuel rod shown in FIG. 3A.

FIG. 10B is a reactor neutron energy spectrum from a simulation associated with the core-cross-section shown in FIG. 9C.

Figures 1A, 1B:
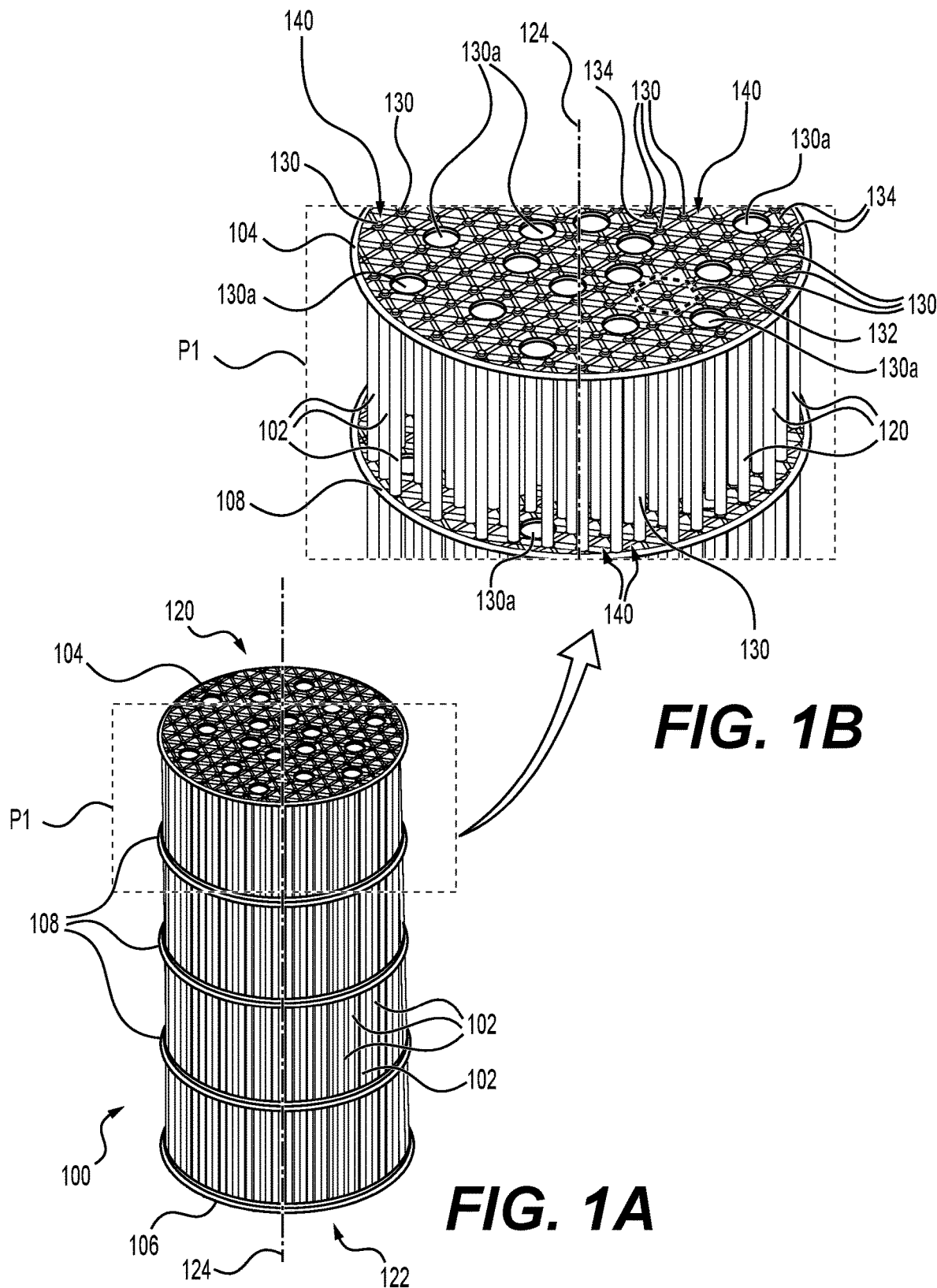
FIG. 1A shows a schematic, perspective view of an assembled reactor core of a fission reactor
FIG. 1B shows a magnified view of a portion of the assembled reactor core shown in FIG. 1A.

Note, for ease of viewing, not all instances of the features shown in the figures are labeled with reference numerals.

DETAILED DESCRIPTION

FIG. 1A shows a schematic, perspective view of an assembled reactor core of a fission reactor. The assembled reactor core 100 comprises a plurality of fuel rods 102, a first end plate 104, a second end plate 106, and a plurality of intermediate support plates 108. A portion P1 of the assembled reactor core 100 shown in FIG. 1A is shown in magnified view in FIG. 1B.

The end plates 104, 106, provide attachment points for the ends of the fuel rods, as well as provide structural support to the assembled reactor core 100 and provide a mating surface for attaching the assembled reactor core 100 to a pressure vessel. The first end plate 104 is located at a first longitudinal end 120 of the reactor core 100 and the second end plate 106 is located at a second longitudinal end 122 of the reactor core 100. The first and second longitudinal ends are located relative to a longitudinally extending central axis 124 of the reactor core 100. Each of the plurality of fuel rods 102 is attached to the first end plate 104 by a first interfacing structure and is attached to the second end plate 106 by a second interfacing structure.

The intermediate support plates 108 reduce hydraulic vibration by providing attachment points for the middle portion of the fuel rods. The plurality of intermediate support plates 108 are located along a longitudinal length (relative to the central axis 124) of the reactor core 100 between the first longitudinal end 120 and the second longitudinal end 122. Each of the plurality of fuel rods 102 is attached to each intermediate support plate 108.

As more clearly seen in FIG. 1B, in a plane perpendicular to the longitudinally extending central axis 124 of the reactor core 100, the plurality of fuel rods 102 are arranged at nodes 130 of a hexagonal pitch arrangement, which is outlined by hexagon 132 in FIG. 1B. In some embodiments, the reactor core 100 includes eighty to one hundred fifty fuel rods 102; in a specific embodiment, the reactor core 100 includes one hundred thirty-three fuel rods 102. In the hexagonal pitch arrangement, a central node 130 has six closest nodes 130 at the vertices of the hexagon 132. The nodes 130 are located in the first end plate 104, the second end plate 106, and the intermediate support plate(s) 108 and are in a spaced-apart arrangement with ligaments 134 interconnecting the nodes 130. Openings 140 (such as triangular holes) are formed by the ligaments 134 and nodes 130. The size of the node 130 corresponds to the diameter of the fuel rod, plus tolerances to allow for assembly (discussed further herein). In a specific embodiment, the nominal size of the node 130 corresponds to a 6 mm diameter of the threaded portion of the assembled fuel rod 102 (discussed further herein). Each node 130 has six ligaments 134 connecting that node 130 to an adjacent node 130 (although this is exemplary and other embodiments can use a different number of ligaments, such as four, five or eight ligaments). In each of the first end plate 104 and the second end plate 106, the openings 140 extend across the thickness of each of the respective end plates, i.e., extend from a first side to a second side of the respective end plate. The openings 140 in the first end plate 104 align with openings 140 in the second end plate 106. Additionally, the openings 140 in the first end plate 104 and the second end plate 106 also align with openings 140 in each intermediate support plate 108, which openings 140 extend across the thickness of each of the respective intermediate support plates 108, i.e., extend from a first side to a second side of the respective intermediate support plate 108. In each end plate and intermediate support plate, the ligaments 134 and the openings 140 form a lattice-like interconnected structure. In some embodiments, the ligaments 134 and nodes 130 define the periphery of the opening 140. In at least one embodiment, the lattice-like interconnected structure includes a series of repeated hexagonal pitch arrangements, which results in a greater hexagonal pitch arrangement throughout each end plate and intermediate support plate.

The first end plate 104, the second end plate 106, and the plurality of intermediate support plates 108 can be formed from a material having a suitable composition to both provide structural support as well as have suitable neutronics related properties to allow for operation of the thermal fission reactor. In example embodiments, the composition of the first end plate, the composition of the second end plate, and the composition of the plurality of intermediate support plates are each an aluminum alloy or a zirconium alloy. In some embodiments, the composition of the first end plate, the composition of the second end plate, and the composition of the plurality of intermediate support plates are each an aluminum alloy. In other embodiments, at least one of the first end plate, the second end plate, and one of the plurality of intermediate support plates are formed from aluminum alloy and at least one of the remaining structures is formed from a zirconium alloy.

The constructions and arrangement of the openings 140 in each end plate 104, 106 and intermediate support plate 108, in combination with the spaced-apart arrangement of the fuel rods 102 in the volume of the reactor core 100 between the end plates 104, 106 and the intermediate support plates 108, form a continuous flow path through the volume of the reactor core 100, which allows a cooling medium, such as light water, to flow through the reactor core 100. In some embodiments, from 60 to 80%, alternatively, 65 to 75%, of the frontal projection defined by the support plates 108 and end plates 104, 106 is open space capable of accommodating cooling medium during operation.

At least two of the nodes 130a of the hexagonal pitch arrangement are sized to allow insertion, translation, removal, or a combination thereof of auxiliary equipment. As such, these alternative nodes 130a function as alternatively sized auxiliary port holes providing access into the interior volume of the reactor core. In some embodiments, there are four such alternative nodes 130a, alternatively, six such alternative nodes 130a, eight such alternative nodes 130a, twelve such alternative nodes 130a, or twenty-two such alternative nodes 130a. These alternative nodes 130a are oversized, insomuch, are not suitable for retaining fuel rods 102.

Examples of auxiliary equipment include a target delivery system for isotopes. Examples of target delivery systems for isotopes are disclosed in U.S. application Ser. No. 15/902,086 filed Feb. 22, 2018, U.S. application Ser. No. 16/511,453 filed Jul. 15, 2019; U.S. application Ser. No. 15/902,534 filed Feb. 22, 2018, U.S. application Ser. No. 16/548,952 filed Aug. 23, 2019, and U.S. application Ser. No. 16/551, 185 filed Aug. 26, 2019, the content of each of these applications are incorporated herein by reference. For example, a target delivery system can produce molybdenum-99 (Mo-99), the parent isotope of technetium-99m (Tc-99m), which is used for diagnostic imaging. Other medical isotopes can also be produced using the target delivery system in combination with the assembled reactor core 100 and fission reactor disclosed herein.

Examples of auxiliary equipment also include control rods. Examples of control rods can include both fissionable fuel material and absorber material, depending on the design of the reactor. When present, fissionable fuel material in control rods indicate a subcritical static core that becomes critical as control rods are inserted; when present, absorber material in control rods indicate a supercritical static core that is suppressed to a critical/subcritical state when the control rods are inserted. The composition of the fissionable fuel material or absorber material can be altered (compositionally and spatially) to mitigate temperature and fission peaking. Movement of the control rods, either singularly or as a group (also called a control rod bundle) can control the reactivity of the reactor. Typically, control rods are attached to a translatable control rod assembly (also known colloquially in the nuclear power industry as a "spider") which can collectively translate the plurality of attached controlled rods. The reactor compensates for different isotopic cross-sections by utilizing a reactivity control system that is inserted and retracted through alternatively sized auxiliary port holes (discuss further herein).

Examples of alternatively sized nodes are shown as features 130a in FIG. 1B. These alternatively sized nodes 130a are specifically placed throughout the greater hexagonal pitch arrangement and are spaced from adjacent nodes 130 for fuel rods by slightly altered openings 140. Each intermediate support plate 108 also has alternatively sized nodes 130a correspondingly arranged and spaced, as are the alternatively sized nodes 130a in the end plates 104, 106. This corresponding arrangement and spacing allows for the auxiliary equipment inserted in to the alternatively sized nodes 130a, e.g., a control rod or target delivery system (which provides passage for target isotope material), to be insertable along the length of the reactor core through at least one of the intermediate support plates 108, alternatively through each of the alternative support plates 108. In a specific embodiment, the nominal size of the alternatively sized nodes 130a is 3 cm to 4 cm.

Figure 2:
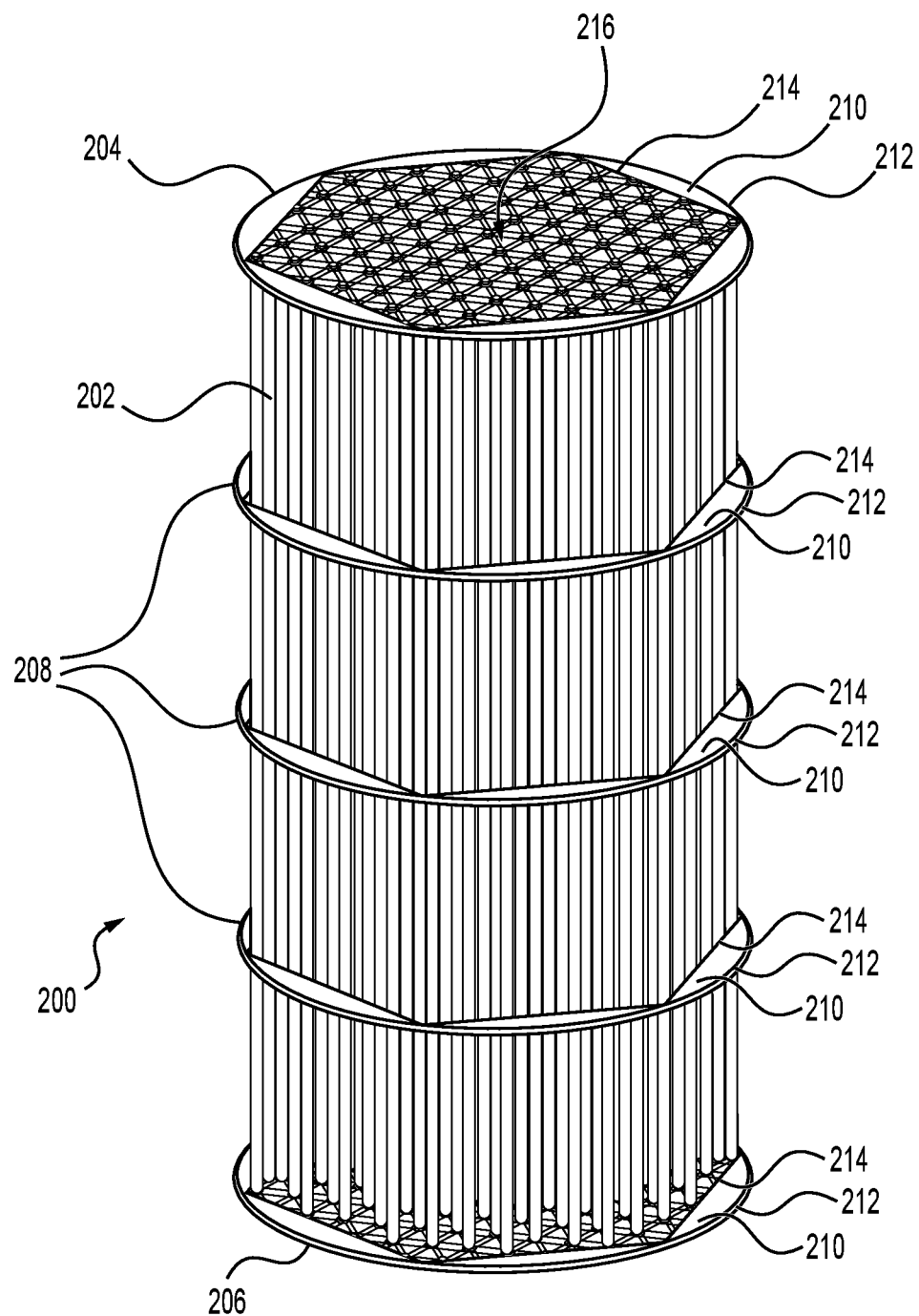
FIG. 2 shows a schematic, perspective view of an alternative form of an assembled reactor core of a fission reactor.

FIG. 2 shows a schematic, perspective view of an alternative form of an assembled reactor core of a fission reactor. The alternative form of an assembled reactor core 200 of a fission reactor shares many features of the reactor core 100 shown and described in connection with FIGS. 1A and 1B. However, in the alternative form in FIG. 2, the assembled reactor core 200 includes a first end plate 204, a second end plate 206, and intermediate support plates 208 in which at least a portion of the lattice-like interconnected structure has been replaced with a solid structure. FIG. 2 illustrates an example of such solid structures for each of the first end plate 204, second end plate 206, and intermediate support plates 208 (collectively referred to in some instances as "plates"). In FIG. 2, a circumferentially outer portion of each of the plates has a solid structure 210. The sold structure 210 is between the periphery 212 of the plate and the edge 214 of the lattice-like structure 216 associated with the hexagonal pitch arrangement. Such a solid structure 210 facilitates mating of the reactor core 200 with a reflector (not shown in FIG. 2) and adds structural stability. Additional stability is formed by removing the alternatively sized nodes 130a, creating more structural material, insomuch, the specific reactor embodiment shown in FIG. 2 is controlled entirely from outside the core and target material is inserted into the reflector. Added structural stability can be useful depending on operating conditions and geographic location. The periphery 212 of any one or more of the plates 204, 206, 208 (alternatively, all of the plates) can be any shape that is conformal to the radially inner surface of the reflector. In some embodiments, all of the plates have this alternative solid+lattice structure; in other embodiments, some plates have a lattice-like interconnected structure and other plates have a solid+lattice structure. As seen in FIG. 2, the lattice-like interconnected structure portion of the solid+lattice structure of the plate reflects the overall hexagon shape of the envelope containing the fuel rods 202.

Figure 3B:
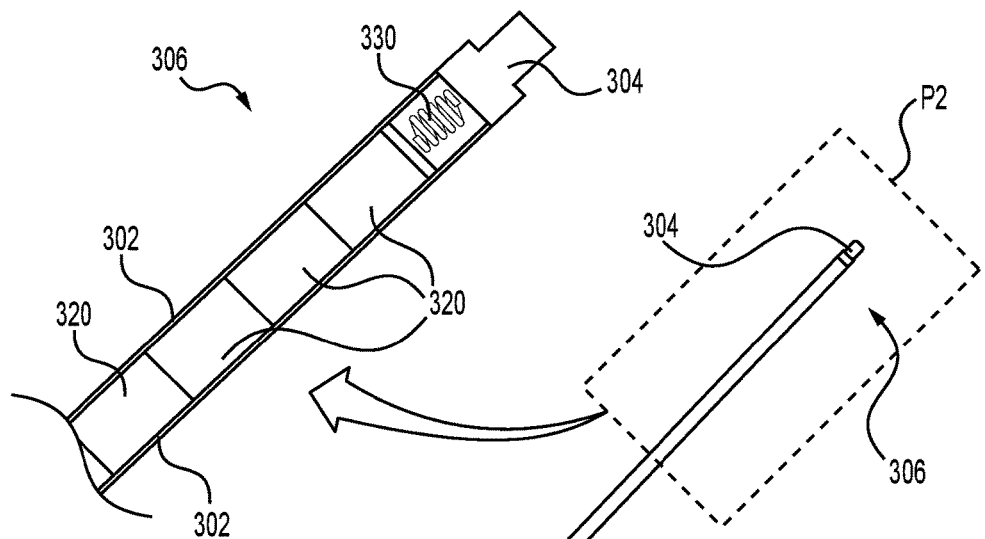
Figure 3B:
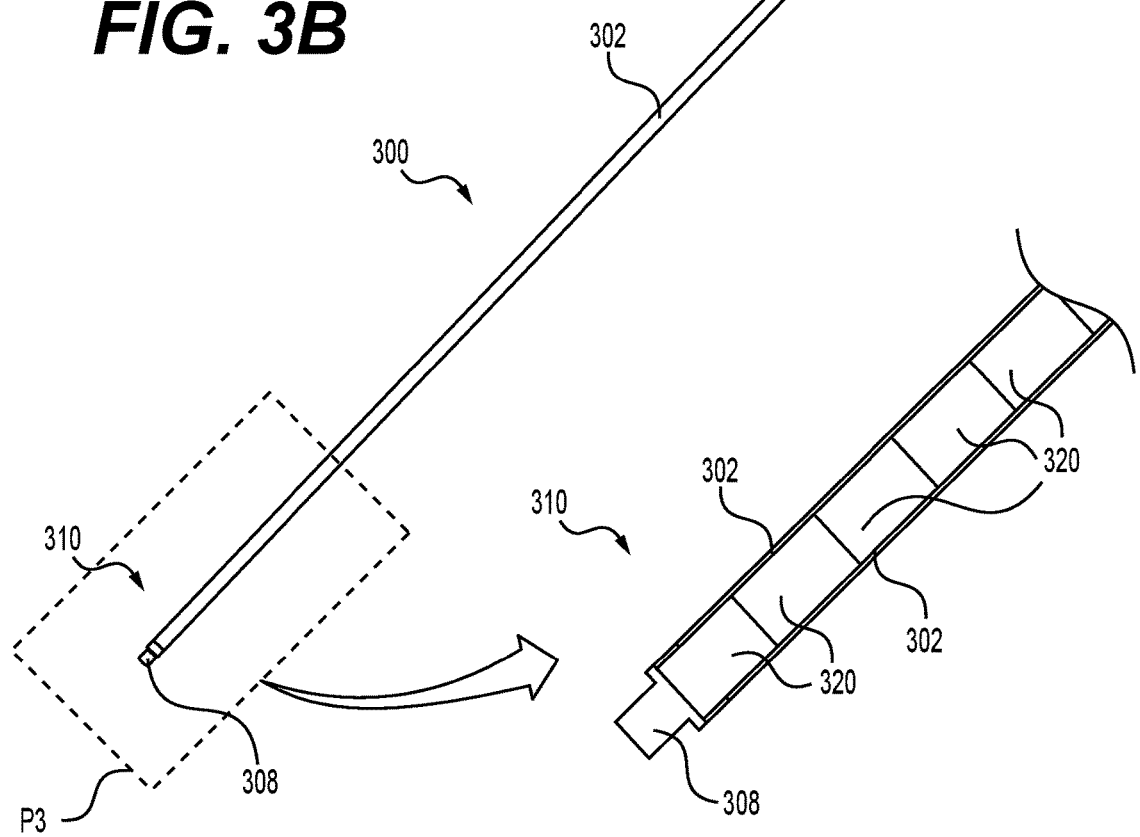

FIG. 3A shows a schematic, perspective view of an assembled fuel rod. The assembled fuel rod 300 comprises a seamless cladding tube 302, a first end cap 304 at a first end 306, and a second end cap 308 at a second end 310. The first end 306 and second end 310 are at opposite axial ends of the assembled fuel rod 300. End portions P2, P3 of the assembled fuel rod 300 shown in FIG. 3A are shown in a cross-section, magnified view in FIGS. 3B and 3C, respectively. The assembled fuel rod 300 also includes a composite fuel composition housed by cladding 302. In exemplary embodiments, the composite fuel composition has a shape of a cylindrical fuel pellet 320. In a specific embodiment, the cylindrical fuel pellet has dimensions of 7.5 mm (±0.5 mm) in diameter. In exemplary embodiments, a plurality of cylindrical fuel pellets 320 are axially stacked within the seamless cladding tube 302 (See FIGS. 3B and 3C). In a specific embodiment, the wall of the seamless tube forming the fuel rod has a thickness of 0.5 mm and the plurality of cylindrical fuel pellets 320 are axially stacked to uniformly fill the fuel stack height associated with the length of the fuel rod. In a specific embodiment, the fuel stack height is 76 cm.

The assembled fuel rod 300 also includes a spring 330 that presses against an interior surface of the end cap, such as first end cap 304, and a surface of the top of the composite fuel composition, such as one of the axially stacked cylindrical fuel pellets 320 (or an intervening structure such as metal or composite plate). The spring 330 helps to hold the composite fuel composition, particularly axially stacked cylindrical fuel pellets, in place and minimizes vibration of fuel during operation and handling. The spring 330 also allows room within the assembled fuel rod 300 for fission gas release during reactor operation.

In embodiments of the assembled fuel rod 300, the first end cap and the second end cap are welded to the seamless cladding tube 302. Additionally, the seamless cladding tube 302, first end cap 304, and second end cap 308 form part of the primary containment barrier of the composite fuel composition within the fuel rod 300.

An example composite fuel composition includes 89-91% BeO, 8.5-10.5% $UO_2$, and 0.25-1.0% $CeO_2$, and the uranium in $UO_2$ includes 80-95% (alternatively, 88-92%) enriched U-235 and the balance is U-234 and U-238. Another example composite fuel composition includes 90% BeO, 9.5% $UO_2$, and 0.5% $CeO_2$, and the $UO_2$ includes 90% enriched U-235 and the balance is U-234 and U-238. In some embodiments, the composite fuel composition is volumetrically homogeneous, mixing the oxide and powders together in the appropriate ratios. In some embodiments, the ceramic BeO surrounds the ceramic fuel and acts as an additional moderator. In some embodiments, the fuel composition (with or without BeO) is manufactured by an additive manufacturing process.

The seamless cladding tube can be formed from a material having a suitable composition to both provide structural support and primary containment, as well as have suitable neutronics related properties to allow for operation of the thermal fission reactor. In some embodiments, the composition of the seamless cladding tube is an aluminum alloy. In other embodiments, the composition of the seamless cladding tube can include all types of Zircaloy, molybdenum, steel, or Hastelloy alloys.

Figure 4:
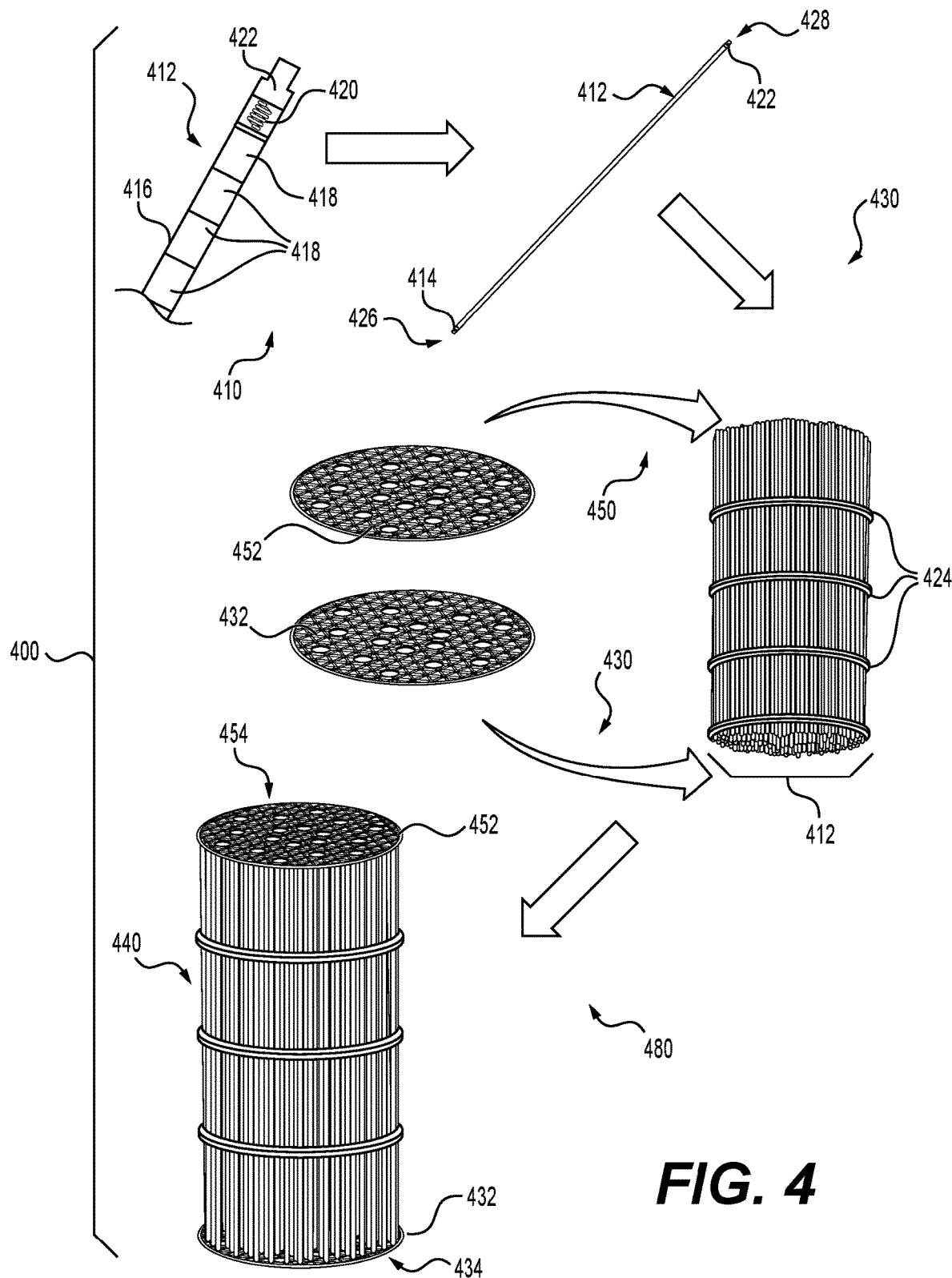
FIG. 4 illustrates principle steps in a method to assemble a reactor core.

FIG. 4 illustrates principle steps in a method to assemble a reactor core. The method 400 includes assembling 410 a plurality of fuel rods 412. For example, a first end cap 414 is attached to a seamless cladding tube 416, for example by welding, leaving one end of the seamless cladding tube 416 open. A plurality of cylindrical fuel pellets 418 are inserted into the open end of the seamless cladding tube 416 and axially stacked within the seamless cladding tube 416 to a desired fuel stack height. The axially stacked cylindrical fuel pellets 418 are held down with a spring 420 that is inserted into the cladding tube 416 and presses a second end cap 422 that is attached to the open end of the seamless cladding tube 416, for example, by welding.

The method 400 continues and a plurality of intermediate support plates 424 are distributed 430, evenly in some embodiments, along a longitudinal length of the plurality of fuel rods 412 and attached thereto. For example, individual fuel rods 412 can be inserted into individual nodes in the intermediate support plates 424 and the intermediate support plates 424 moved along the length of the plurality of fuel rods 412 to arrange the intermediate support plates 424 in spaced-apart relationship between the first longitudinal end 426 and the second longitudinal end 428 of the plurality of fuel rods 412. In exemplary embodiments, each fuel rod 412 is identical with respect to features and construction that effect the neutronics and performance of the fuel rod during operation in a fission reactor. Therefore, during assembly with the intermediate support plates 424, there is no need to position specific fuel rods at specific locations of the intermediate support plates 424. This simplifies construction and assembly.

Once the intermediate support plates 424 are in the desired arrangement relative to the plurality of fuel rods 412 and relative to each other, each of the plurality of fuel rods 412 is attached to each intermediate support plate 424. Attaching the plurality of fuel rods 412 to each intermediate support plate 424 can be by any suitable means. In one embodiment, attachment is by welding, for example, laser welding, Tungsten Inert Gas (TIG) welding, Metal Inert Gas (MIG) welding, or Manual Metal Arc (MMA) welding; in another embodiment, attachment is by diffusion bonding, for example by diffusion welding, or through a Hot Isostatic Pressing (HIP) process.

The method 400 continues and attaches each of the plurality of fuel rods 412 to the end plates 432, 452. This can be done in any suitable sequence. Typically each of the plurality of fuel rods 412 is first attached 430 to the second end plate 432 resulting in the second end plate 432 being located at the second longitudinal end 434 of the reactor core 440. In this instance, each of the plurality of fuel rods 412 can be permanently or releasably attached to the second end plate 432. Attachment can be by an interfacing structure. An example interfacing structure includes the second end cap 414 including male threads, a receiving opening in the second end plate 432 having complimenting female threads, and the fuel rod 412 being directly threaded into the second end plate 432 by threading the male threads of the second end cap 414 into the female threads of the second end plate 432. Such a direct threading can be releasable or can be permanent by, for example, welding the fuel rod 412 to the second end plate 432 after direct threading. In another example, the interfacing structure includes male threads of the second end cap 414 passing through a receiving opening in the second end plate 432 and protruding past the surface of the second end plate 432 and a nut with complimenting female thread that is threaded onto the male threads of the second end cap 414. Tightening of the nut pulls the fuel rod 412 tight to the second end plate 432. Such a threaded nut attachment can be releasable or can be permanent by, for example, welding the nut to the second end cap 414 or second end plate 432 after tightening.

After attachment to the second end plate 432, each of the plurality of fuel rods 412 is attached 450 to the first end plate 452 located at the first longitudinal end 454 of the reactor core 440. In this instance, each of the plurality of fuel rods 412 can be permanently or releasably attached to the first end plate 452. Attachment can be by an interfacing structure. An example interfacing structure includes male threads of the first end cap 422 passing through a receiving opening in the first end plate 452 and protruding past the surface of the first end plate 452 and a nut with complimenting female thread that is threaded onto the male threads of the first end cap 422. Tightening of the nut pulls the fuel rod 412 tight to the first end plate 452. Such a threaded nut attachment can be releasable or can be permanent by, for example, welding the nut to the first end cap 422 or first end plate 452 after tightening.

Figure 5:
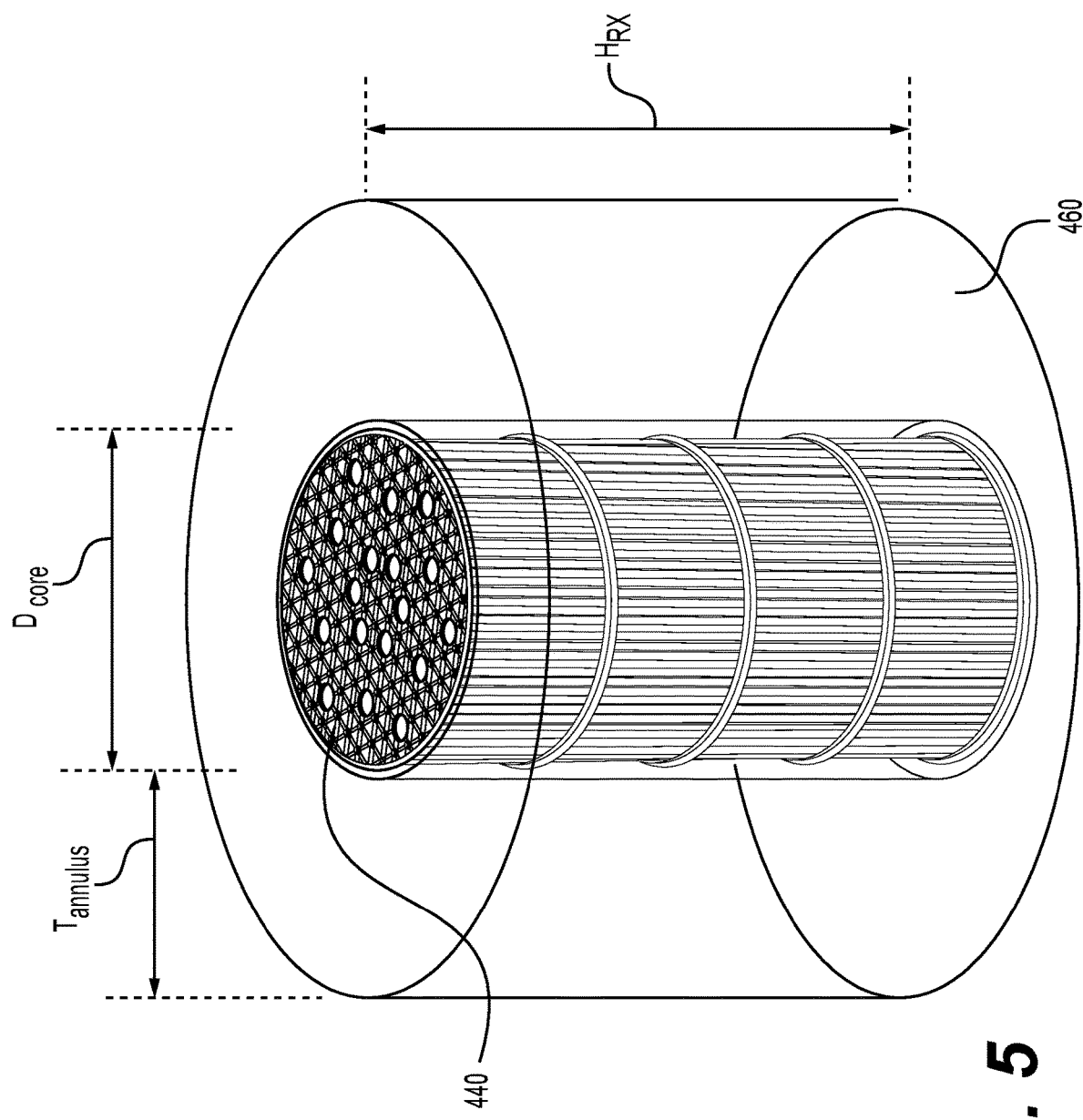
FIG. 5 schematically illustrates in perspective view an example embodiment of an assembled reactor core conformally mated to a reflector.

The assembled reactor core 440 can be utilized as a reactor core in a fission reactor, such as a light water fission reactor. In this instance, a radially outer surface of the assembled reactor core 440 is conformally mated to a radially inner surface of a reflector 460. FIG. 5 schematically illustrates in perspective view an example embodiment of an assembled reactor core 440 conformally mated to a reflector 460. In alternative arrangements, there exists a gap between an outermost surface of the assembled reactor core 440 and an innermost surface of the reflector 460 and a control curtain containing or formed of one or more of a various neutron absorption materials axially translates within the gap to control the reactor. In exemplary embodiments, such curtains can have a radial thickness of 2 to 8 cm.

In a specific embodiment of the assembled reactor core 440 and reflector shown in FIG. 5, the reactor height ($H_{RX}$) is 76 cm, the diameter of the core ($D_{core}$) is 40 cm, and the thickness of the annulus ($T_{annulus}$) formed by the reflector is 30 cm.

Figure 6:
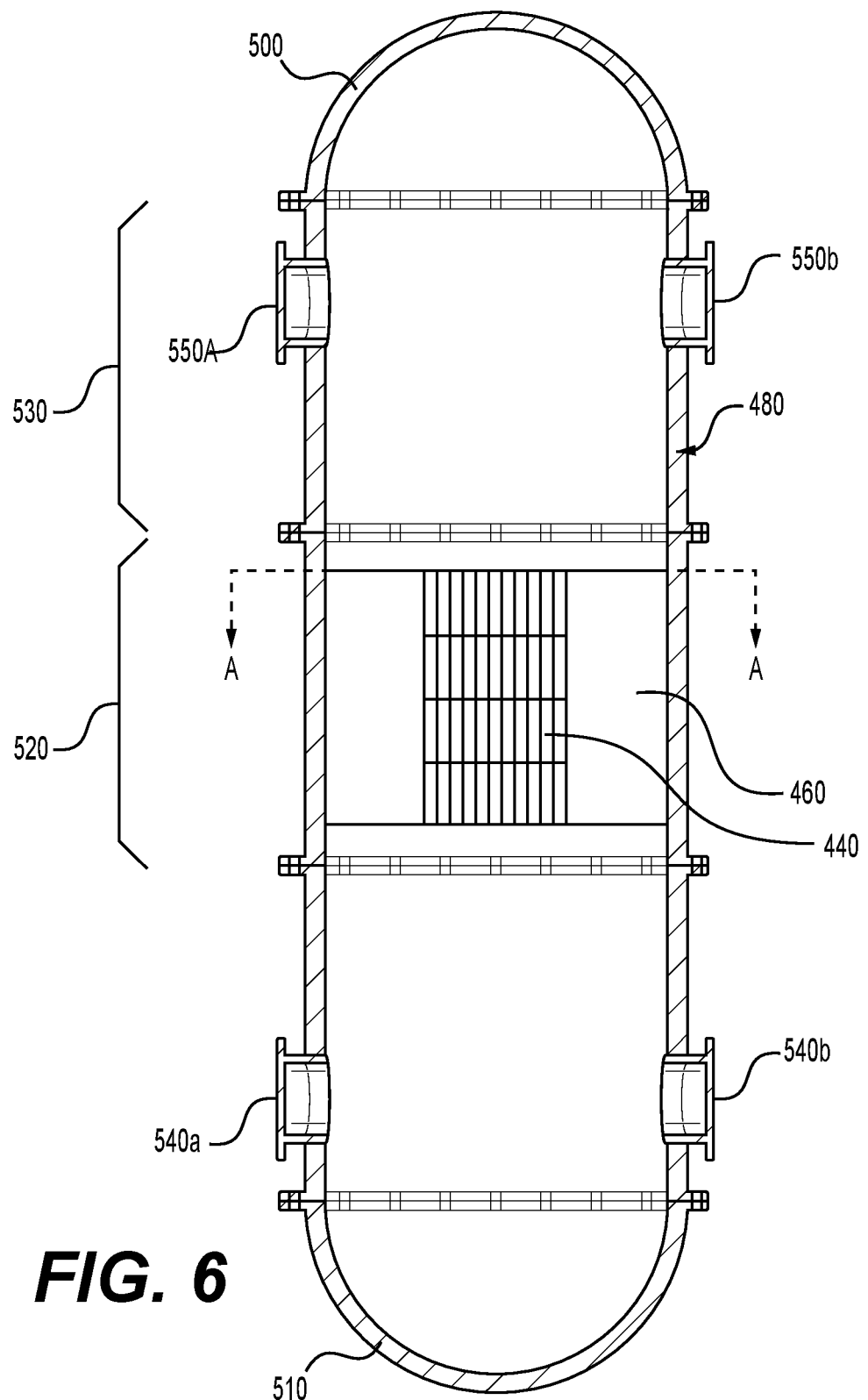
FIG. 6 is a side, cross-sectional view showing the assembled reactor core and reflector assembled with a pressure vessel.
Figure 7:
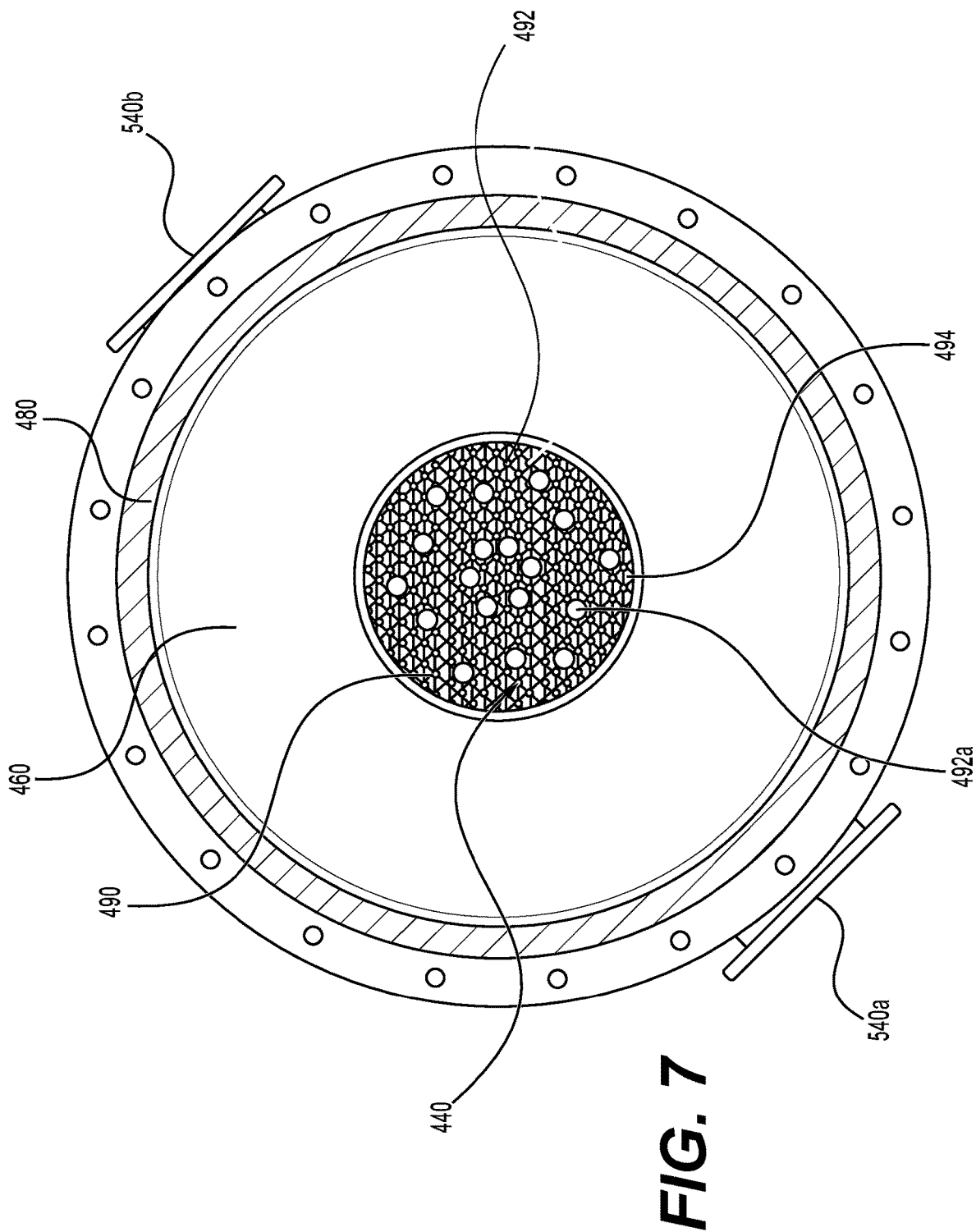
FIG. 7 is a cross-sectional view of section A-A in FIG. 6 showing a surface of the assembled reactor core and reflector assembled with the pressure vessel and also providing another view of the lattice-like interconnected structure of the first end plate.

The assembled reactor core 440 and reflector 460 can then be assembled within a pressure vessel 480. For example, the first end plate of the assembled reactor core 440 can be connected, such as by a fastener, to a first brace attached to an inner surface of a pressure vessel 480 and the second end plate of the assembled reactor core 440 can be connected, such as by a fastener, to a second brace attached to the inner surface of the pressure vessel 480. All of these components will rest on a core plate (not shown) that is permanently attached to the pressure vessel that will act as a control and handling guide, and support the weight of the reflector 460 and the reactor core 440. FIG. 6 is a side, cross-sectional view showing the assembled reactor core and reflector mated with a pressure vessel and FIG. 7 is a cross-sectional view of section A-A in FIG. 6 showing a surface of the assembled reactor core and reflector mated with the pressure vessel. FIG. 7 provides another view of the lattice-like interconnected structure of the first end plate 490 including nodes 492 for the fuel rods, openings the alternatively sized nodes 492a for auxiliary equipment, and the open flow channels 494 (for example, to accommodate coolant flow) formed between the nodes.

The pressure vessel 480 in FIG. 6 is shown in partial transparent view, which allows for observation of interior features. The pressure vessel 480 surrounds and restrains the assembled reactor core 440 and reflector 460, as well as ancillary equipment such as control rod drive mechanisms (CRDMs, not shown), and is comprised of an upper dome section 500 and lower dome section 510 and a main section 520 located corresponding to the region housing the assembled reactor core 440 and reflector 460. The shape of the upper dome section 500 and lower dome section 510 can be other than a dome depending on the operating conditions and housed ancillary equipment. One or more extension sections 530 on one or either side of the main section 520 provide a stand-off distance between the assembled reactor core 440 and reflector 460 and a control region containing ancillary equipment and provides sufficient space for operation of the ancillary equipment, such as for the CRDM stroke length. Each of these sections is bolted to the other via mating hole patterns, the number and location of which are as prescribed by the ASME Pressure Vessel Code.

The pressure vessel 480 has two cold leg ports 540a, 540b that are in fluid connection with a heat exchanger (not shown) and two hot leg port 550a, 550b in fluid connection with the heat exchanger (not shown). More or less hot and cold leg parts may be used per design constraints. In the embodiment shown in FIG. 6, the control rod drive shaft retention tubes could be housed within the pressure vessel 480 if the control rod motors meet the necessary design conditions. Alternatively, the control rods drive mechanism(s) extend past the envelope of the upper dome section 500 and are contained within control rod drive shaft retention tubes providing them a separate, more temperate climate. Each of the hot leg port flange, cold leg port flange, and control rod drive shaft retention tubes are welded to the appropriate section of the pressure vessel 480.

In addition, the pressure vessel includes one or more sealable openings that are positioned to provide access to the target delivery system for isotopes. The sealable openings are arranged relative to the target delivery system and its location in the alternatively sized nodes to allow one to place a volume of material, such as molybdenum-98, ytterbium-176, yttrium-89, radium-226 (or other suitable medical isotopes), into one of the target delivery system for isotopes. After inserting the target delivery system for isotopes into one of the alternatively sized nodes and irradiating the target delivery system for isotopes with radiation from the light water fission reactor, one can then recover the irradiated volume of material via the sealable openings.

In exemplary embodiments, the pressure vessel is manufactured from stainless steel having a yield strength of at least 30 kpsi (about 207 kPa). In some embodiments, the pressure vessel can withstand an internal pressure of 500 psi (approximately 3450 Pa) while passing ASME Boiler and Pressure Vessel allowances of ⅓ the yield strength.

Figure 8:
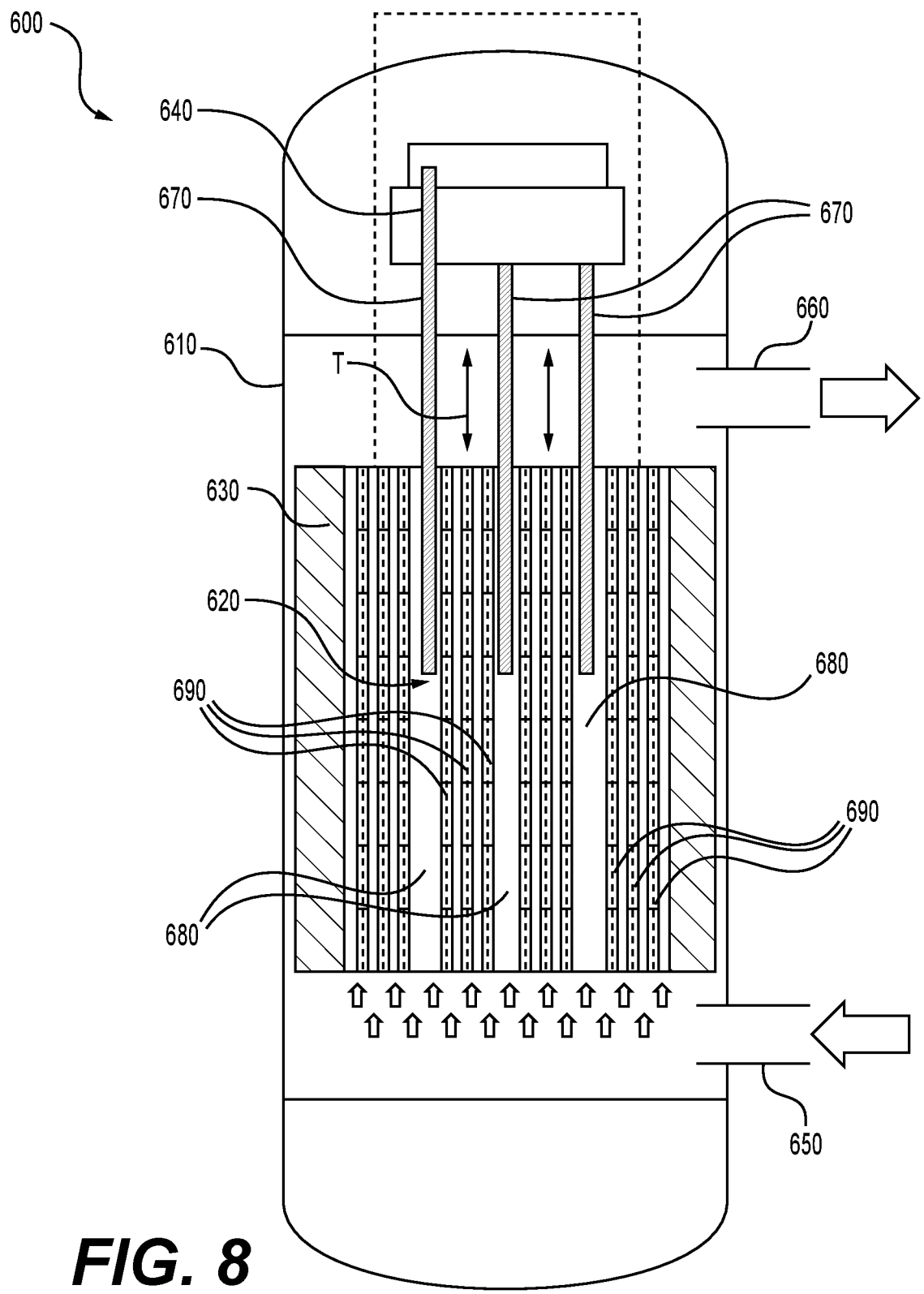
FIG. 8 is a schematic, longitudinal cross-sectional diagram illustrating the general arrangement of major components of another embodiment of a fission reactor.

FIG. 8 is a schematic, cross-sectional view illustrating the general arrangement of major components of another embodiment of a fission reactor, such as a light water fission reactor. The fission reactor 600 includes a pressure vessel 610 surrounding and restraining the assembled reactor core 620 and reflector 630, as well as ancillary equipment such as control rod drive mechanisms (CRDMs) 640. The pressure vessel 610 has one cold leg port 650 that is in fluid connection with a heat exchanger (not shown) and one hot leg port 660 in fluid connection with the heat exchanger (not shown). As indicated by the wide arrows in FIG. 8, coolant is supplied to the cold leg port 650, flows through the coolant channels of the assembled reactor core 620, and exits at the hot leg port 660. More or less hot and cold leg parts may be used per design constraints. In exemplary embodiments, the coolant is light water and the flow rate is 25,000 gallons per minute (gpm) (about 95,000 liters per minute) at normal operating conditions. Start-up and shutdown routines will modulate the flow accordingly to match power production and consumption. Control rods 670 are inserted into, and are translatable (T) within, alternatively sized nodes 680. In some embodiments, the control rod assembly is translatable (T) so that control rods can be fully inserted into the active core. Schematic cross-sectional views of fuel rods 690, which are positioned at nodes of the lattice-like interconnected structure of the end plates and intermediate plates, are also shown.

Figure 9A:
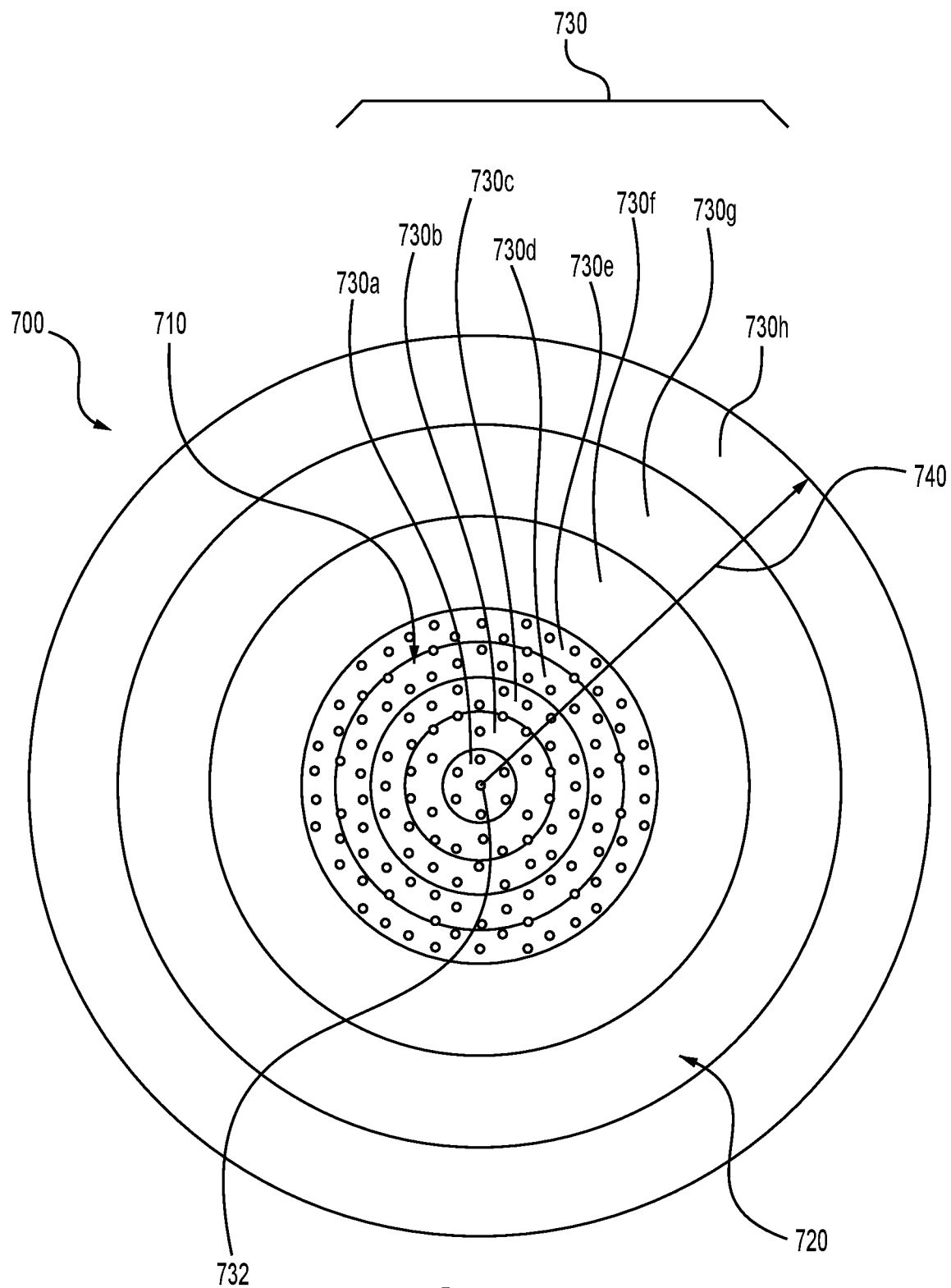
FIG. 9A is a cross-section of an idealized, assembled reactor core and reflector used in a nuclear physics simulation using Monte-Carlo N-Particle (MCNP) software

The neutron spectrum of the assembled reactor core and reflector was investigated. An idealized, assembled reactor core and reflector were used in a simulation of the neutron spectrum using Monte-Carlo N-Particle (MCNP) software. FIG. 9A is a cross-section of the idealized, assembled reactor core and reflector used in the simulation. The idealized, assembled reactor core and reflector (collectively indicated by 700) includes an assembled reactor core 710 consistent with the disclosure herein (such as the disclosure associated with the assembled reactor core in FIG. 1A) and a reflector 720 concentrically located about the cylindrical outer surface of the assembled reactor core 710. The idealized, assembled reactor core and reflector was divided into concentric zones 730 with a first zone 730a at the radial center 732 and subsequent zones 730b to 730h in a radially outward direction (indicated by arrow 740).

Two variations of an idealized, assembled reactor core and reflector were investigated using MCNP. The first variation 750 is shown in magnified cross-sectional view in FIG. 9B and included five zones in the assembled reactor core 710 and three zones in the reflector 720. In the first variation 750, fuel rods 760 (represented by circles in the assembled reactor core 710) were located in a hexagonal pitch arrangement at nodes in the end plates and intermediate plates while leaving open the alternative nodes 492 as discussed herein (see, for example, FIGS. 1A-B, 2 and 7 and related disclosure). The first variation 750 in FIG. 9B was used as a baseline in the neutron spectrum investigation, as it represents a beginning-of-life "empty" core, or a core with no target material. The second variation 770 is shown in magnified cross-sectional view in FIG. 9C and was the same as the baseline, including five zones in the assembled reactor core 710 and three zones in the reflector 720. However, different from the baseline, the second variation 770 included Mo-98 columns 780 located in a hexagonal pitch arrangement at the six, closest to the center, alternatively sized nodes in the end plates and intermediate plates as discussed herein (see, for example, FIGS. 1A-B, 2 and 7 and related disclosure). In the embodiment shown in FIG. 9C, the Mo-98 columns 780 are also positioned in a hexagonal arrangement in a second zone 730b from the radial center 732 and are also centered on the radial center 732 of the assembled reactor core 710. Each Mo-98 column 780 takes up the full core height and approximately equates to a one week production of isotopes.

Figure 9B:
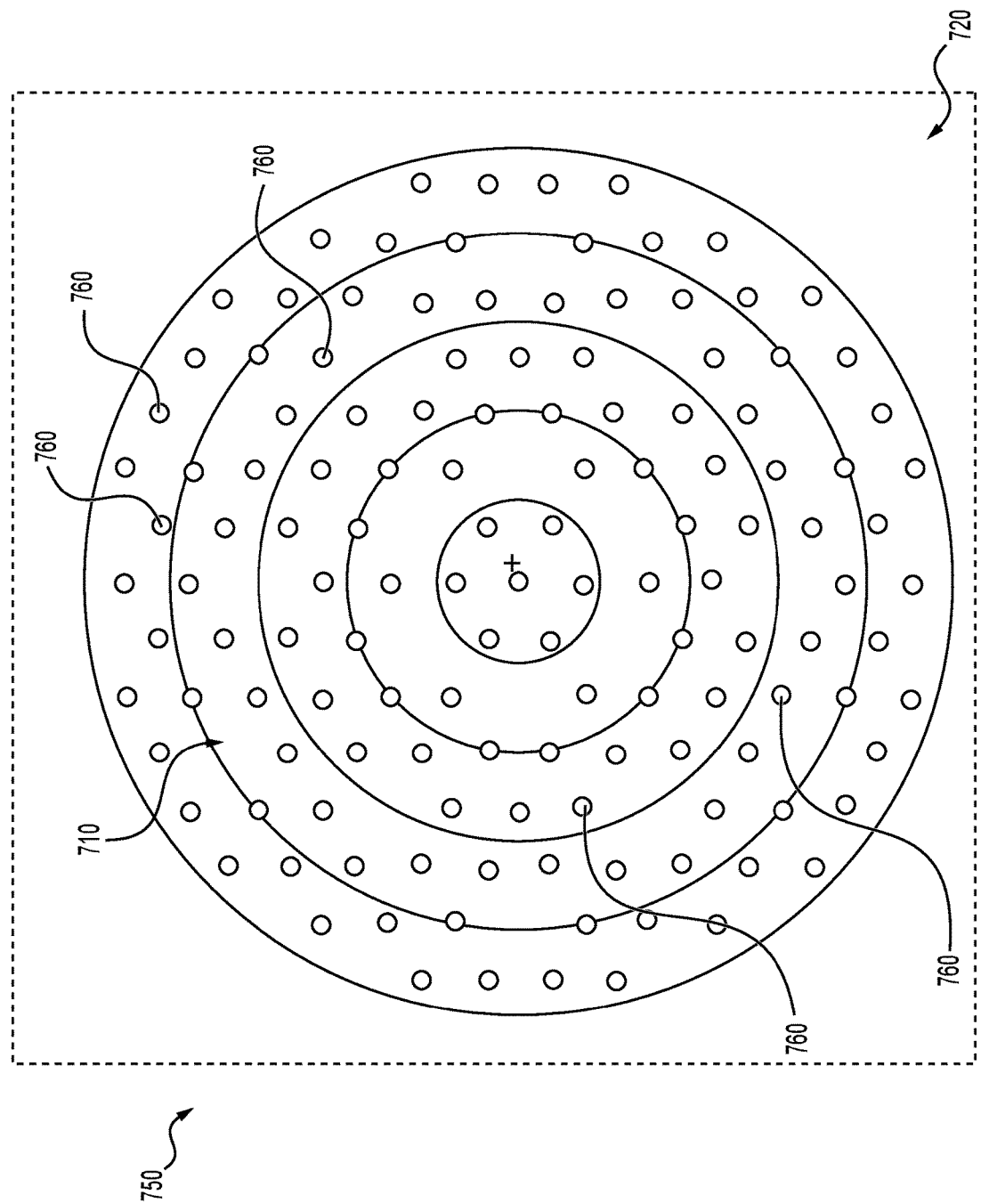
FIGS. 9B and 9C are magnified views of two variations of the cross-section in FIG. 9A, one with an addition of Mo-98 columns (FIG. 9C) and one without such an addition (FIG. 9B), i.e., an empty core.
Figure 9C:
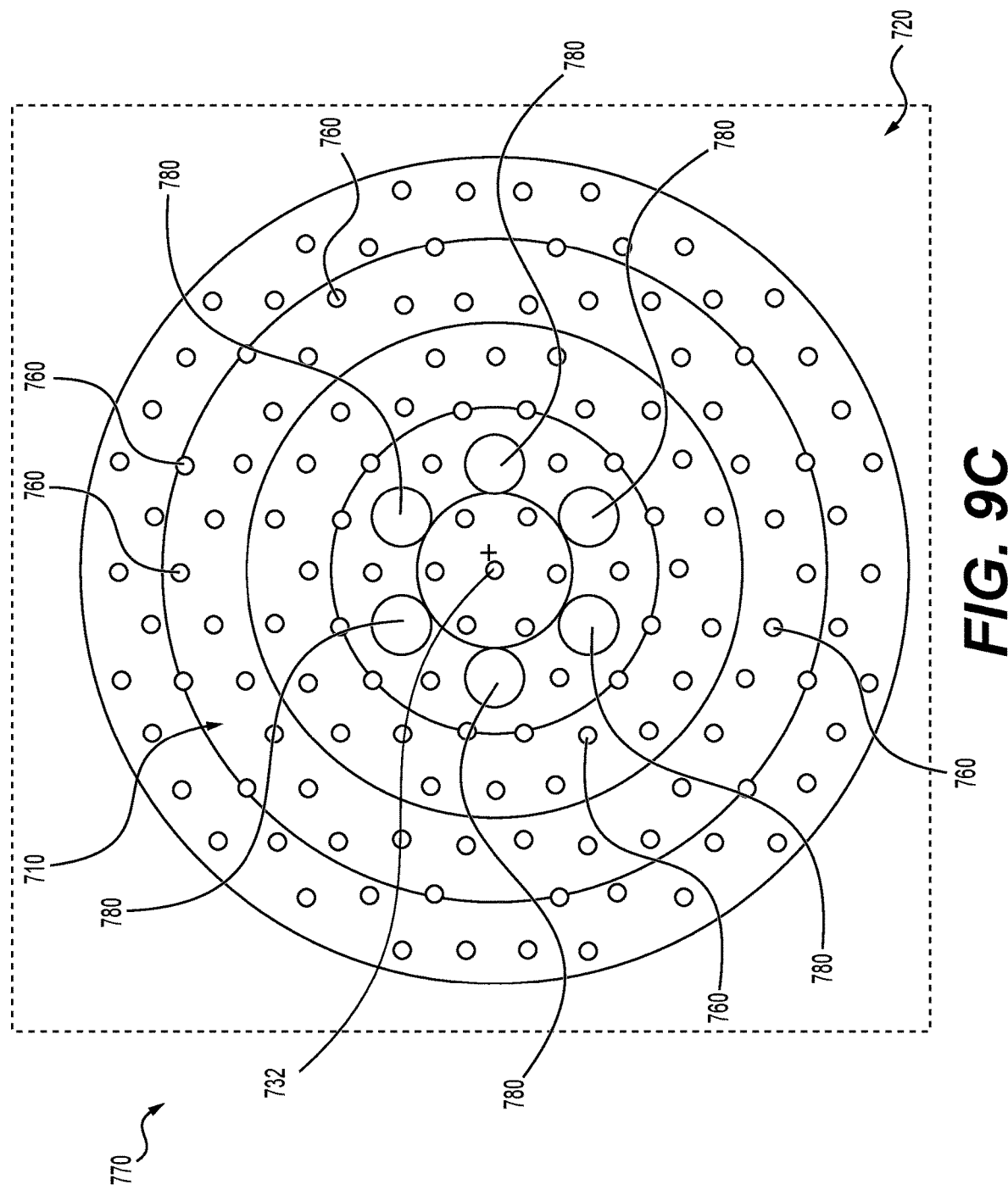
Figure 10A:
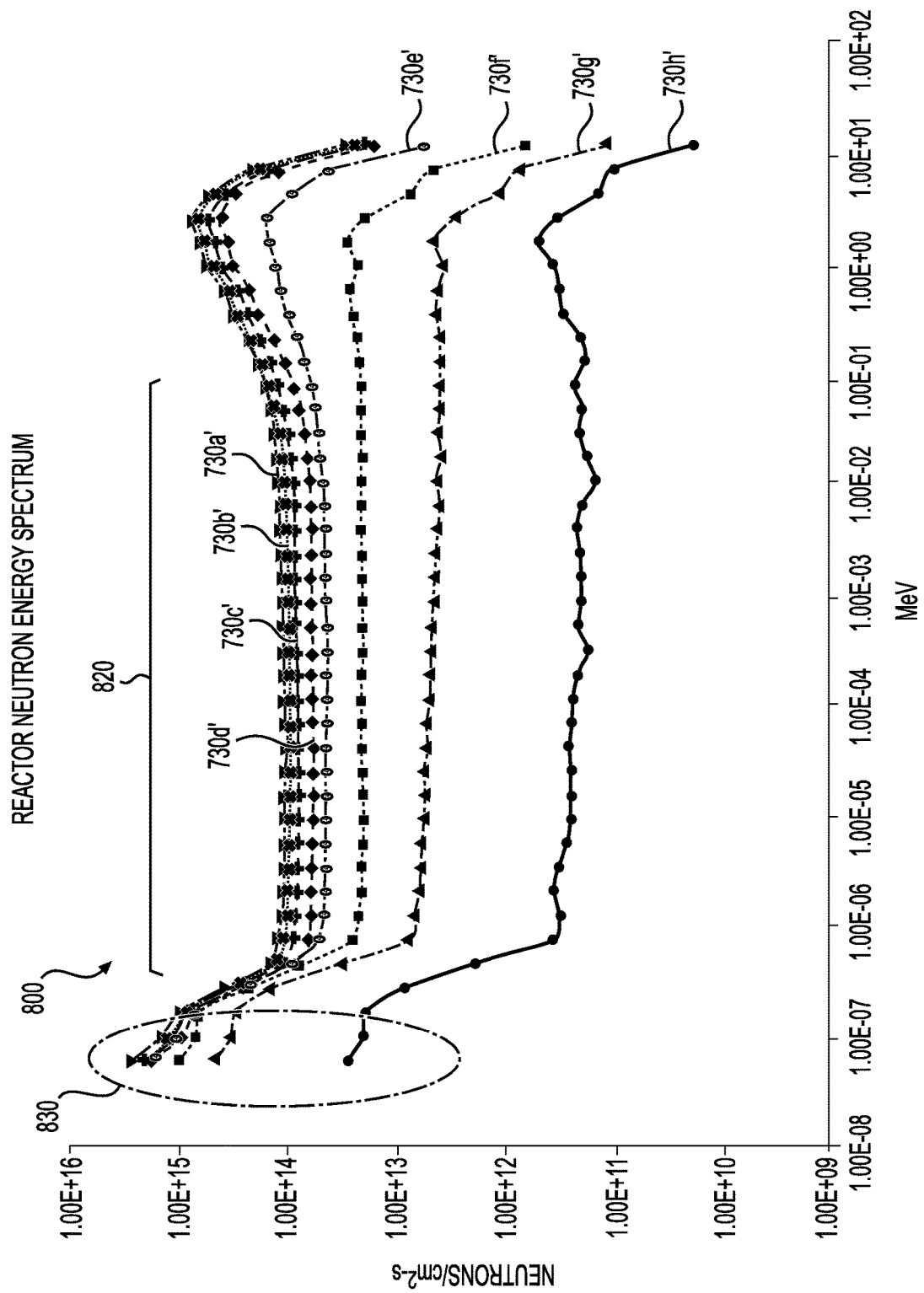
FIG. 10A is a reactor neutron energy spectrum from a simulation associated with the core cross-section shown in FIG. 9B

FIG. 10A is a reactor neutron energy spectrum 800 from a simulation associated with the core cross-section shown in FIG. 9B and FIG. 10B is a reactor neutron energy spectrum 810 from a simulation associated with the core-cross-section shown in FIG. 9C. In both reactor neutron energy spectrums 800, 810, neutron flux in neutrons per centimeter squared per second (neutrons/cm$^2$-s) is plotted as a function of energy of the neutron (MeV). Each line in the plots shown in FIGS. 10A and 10B is for a different zone (730a to 730h) of the concentric zones 730, as designated in the simulation (see above discussion) and the labeling of each line in the plots in FIGS. 10A and 10B are based on the zones as shown in FIG. 9A, except that that reference numeral for the line in the plots in FIGS. 10A and 10B includes a "prime" or "double prime", while the reference numeral for the structural feature in FIG. 9A does not. As an example, in FIG. 10A, line 730h' is for zone 730h on the outside of the reflector 720 and line 730a' is for the zone 730a at the center of the assembled reactor core 710, and in FIG. 10B, line 730h" is for zone 730h on the outside of the reflector 720 and line 730a" is for the zone 730a at the center of the assembled reactor core 710. The point farthest left for each plot line represents the thermal neutron energy datum, i.e., neutrons with energy levels equal to or less than 0.06 eV (Enthermal 0.06 eV).

As seen in FIG. 10A, the peak neutron flux for the baseline assembled reactor core 710, i.e., the assembled reactor core 710 without any inserts, such as associated with a target delivery system, is 2.85×10$^{15}$ (neutrons/cm$^2$-s). The peak thermal neutron flux of 2.85×10$^{15}$ (neutrons/cm$^2$-s) for the baseline assembled reactor core 710 is greater than the peak thermal neutron flux of 2.6×10$^{15}$ (neutrons/cm$^2$-s) associated with a comparable baseline HFIR. The peak thermal neutron flux approximately halfway through the reflector 720, such as at the results for zone 730g shown by the least most point in line 730g', is about 0.8×10$^{15}$ (neutrons/cm$^2$-s).

In FIG. 10A, the lines associated with the assembled reactor core 710, i.e., lines labeled 730a' to 730e', exhibit a plateau 820 in neutron flux of between about 5×10$^{13}$ and about 2×10$^{14}$ (neutrons/cm$^2$-s). This plateau 820 is associated with neutrons having an energy that ranges from between 5×10$^{-7}$ and 1×10$^{-6}$ to about 1×10$^{-1}$ (MeV). Most fast neutrons (see right side of FIG. 10A) that are moderated to thermal neurons (see left side of FIG. 10A) skip of this intermediate energy zone when losing energy, hence the plateau between the two peaks.

In FIG. 10B, the lines associated with the assembled reactor core 710, i.e., lines labeled 730a" to 730e", also exhibit a plateau 850 in neutron flux of between about 8×10$^{13}$ and about 2×10$^{14}$ (neutrons/cm$^2$-s). This plateau 850 is associated with neutrons having an energy that ranges from between 7×10$^{-7}$ and 1×10$^{-6}$ to about 1×10$^{-1}$ (MeV). Also, from the simulation illustrated in FIG. 10B, it was determined that thermal neutron flux at radially outermost edge of the Mo-98 column 780 was 1.82×10$^{15}$ (neutrons/cm$^2$-s) (see left most point of line 730c" in region 860). While large amounts of Mo-98 will cause drops in the neutron flux, one column of Mo-98 in the assembled core would have a neutron flux near the baseline (i.e., a core without Mo-98) maximum of 2.85×10$^{15}$ (neutrons/cm$^2$-s).

For the baseline reactor, the results for neutron flux in FIG. 10A indicates that, in generally, for a given energy of the neutron (MeV), the neutron flux is sequentially greater as one moves toward the radial center 732 of the assembled reactor core 710. This is evidenced in FIG. 10A by lines 730a' to 730h' sequentially increasing in neutron flux as the zone moves from zone 730h on the outside of the reflector 720 to line 730a" for the zone 730a at the center of the assembled reactor core 710. This sequentially greater relationship is most evident in the plateau region 820, but can also be observed in region 830. In contrast, for the reactor with the Mo-98 columns 780, the results for neutron flux in FIG. 10B indicates that the neutron flux in the zones associated with the assembled reactor core 710, i.e., lines labeled 730a" to 730e", are not consistently sequentially greater (for a given energy of the neutron (MeV)) as one moves toward the radial center 732 of the assembled reactor core 710. Rather and as seen in FIG. 10B, in some instances, line 730b" and/or line 730c" and/or line 730d" are out of sequence and above the lines for the more inward zones. See, for example regions 860, 870 and 880. Also, lines 730a", 730b", and 730c" approximately overlap each other in the plateau region 850. The non-sequential values of the neutron flux for the results corresponding to zones 730a to 730e, in particular with regard to zones 730a to 730c, is due to the location of the Mo-98 column 780 in zone 730b in the simulation. In some instances, the neutron flux in zone 730c, e.g., the neutron flux shown in line 730c", is the highest neutron thermal flux due to neutron absorption of the Mo-98 column 780 located towards the radial center 732 of the assembled reactor core 710.

In addition, as seen from the results of the simulation shown in FIGS. 10A and 10B, the range of values of neutron flux and energy of the neutrons are the same for the plateau 850 for the assembled reactor core 710 with the Mo-98 columns 780 and for the plateau 820 for the assembled reactor core 710 of the baseline. This means the neutrons between the fast and thermal energies are untouched in both cases. This is expected, the moderating material transfers neutrons directly from fast to thermal energies and the Mo-98 primarily absorbs thermal neutrons, no effect interacts with the intermediate energy neutrons.

Finally, the results of the simulation indicate that isotope material with larger cross sections or less thermal flux requirements can be irradiated in the reflector or core edge. This frees up the very high thermal fluxes in the center of the core for more thermal neutron intensive target material.

Figure 11:
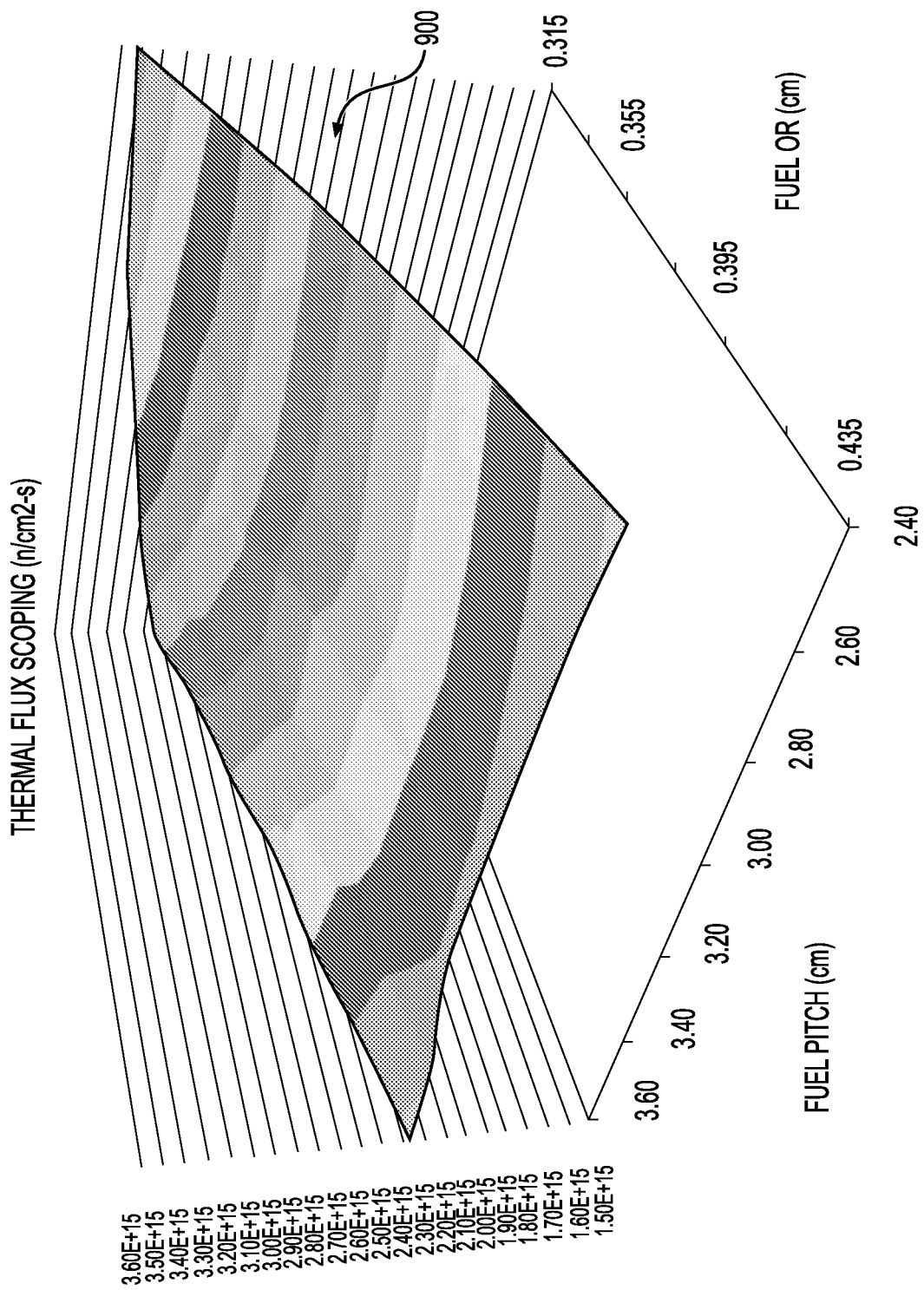
FIG. 11 is a surface plot of thermal neutron flux (Z-axis) over a fuel outer radius vs. fuel rod pitch projection (XY-plane comprised of multiple simulations).

Optimization routines can be applied to trend towards best-case independent parameters for the disclosed reactor core and thermal fission reactor. For example, FIG. 11 is a surface plot 900 of thermal neutron flux over a fuel outer radius vs. fuel rod pitch projection for a constant fuel enrichment of 90%. In FIG. 11, the lower left axis illustrates a range of fuel pitch (cm) and the lower right axis illustrates a range of fuel outer radius (cm). The pitch corresponds to the distance separating nodes at which the fuel rods are located in the assembled reactor core (measured from centerline to centerline of the nodes). A two-dimensional (2-D) independent variable surface projection routine was applied and the surface plots superimposed relative to each other to understand the overall scope. The results in FIG. 11 shows a trend towards thinner fuel (e.g., smaller fuel rod diameter) and tighter pitches (e.g., closer nodes) leads to increased thermal neutron flux.

Figure 12:
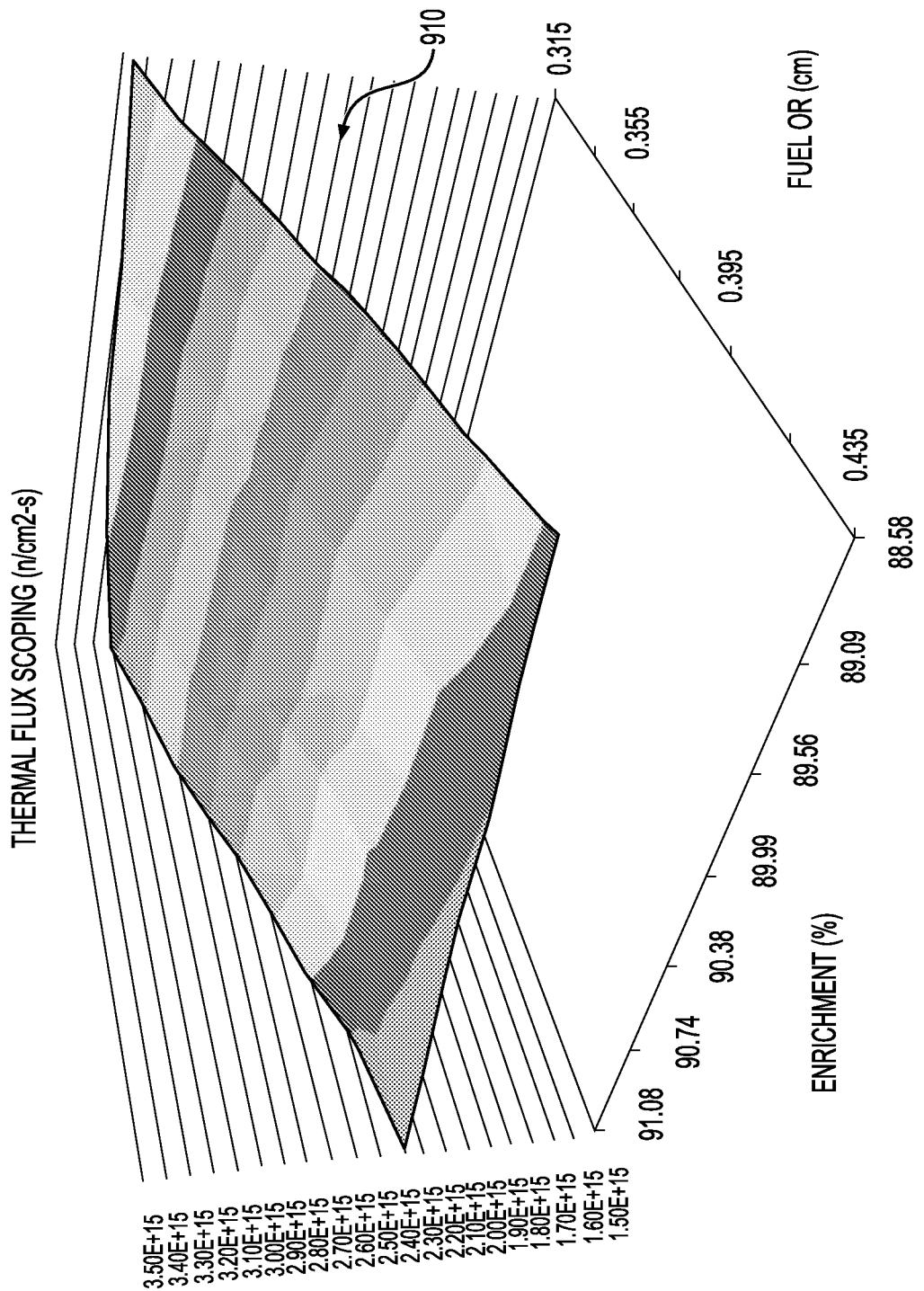
FIG. 12 is a surface plot of thermal neutron flux (Z-axis) over a fuel outer radius vs. enrichment % projection (XY-plane comprised of multiple simulations).

Enrichment may also be simulated and optimized. FIG. 12 is a surface plot 910 of thermal neutron flux over a fuel outer radius vs. enrichment % projection. In FIG. 12, the lower left axis illustrates a range of enrichments (%) and the lower right axis illustrates a range of fuel outer radius (cm). A two-dimensional (2-D) independent variable surface projection routine was applied and the surface plots superimposed relative to each other to understand the overall scope. This surface mapping optimization led to an unexpected observation that lowering the enrichment can increase the thermal neutron flux. For example, by adding more U-235 to the system, U-238 is removed. At high enrichments, U-238 can perform thermalizing effects resulting in higher thermal fluxes. The effect is minor, increasing only 0.15 n/cm$^2$-s in thermal neutron flux while everything else remains constant; however, small performance increases could add a couple days of total neutrons per cycle, facilitating target material activation. In addition, other optimization results showed that decreasing both fuel pellet outer radius and enrichment could increase thermal neutron flux.

In addition to the above, surfaces generated from simulations can be superimposed to analyze super-dimensional design space. A non-exhaustive list of design parameters that can be used in simulations to generate such surfaces include: neutron flux, longevity, and control methods. In addition, thermal-hydraulic interaction can root the optimization routines in reality, verifying the power produced can be absorbed by the coolant (e.g., light water).

FIGS. 11 and 12 can be used in at least the initial design of a reactor. For example, for a given flux, one can use the surface plot 900 in FIG. 11 to obtain a value for the fuel pitch (for the hexagonal pitch arrangement) and a fuel outside radius (for sizing the fuel rod). For that same flux and fuel outside radius, one can then use the surface plot 910 in FIG. 11 to obtain the fuel enrichment. The surface plots 900, 910 can be used in a similar way using other starting parameters to obtain design values for the reactor. Additionally, multiple plots of different parameters can be used to optimize the basic parameters of the reactor design.

The arrangements disclosed herein represent a simple hexagonal pitch reactor design, where the pitch is the distance between the centerline of the regions containing the fissionable fuel composition in adjacent fuel rods. For example, in the FIGS. 1A-B embodiment with a fissionable fuel composition having a 7.5 mm diameter, the pitch (P) can be 3 to 8 cm, and is 3 cm for specific embodiments.

The arrangements shown and described herein are each a singular example and the base dimensions disclosed herein can be altered to optimize different reactor properties based on material ratios (e.g. fuel enrichment or U-235 mass minimization).

It will also be appreciated that the power, dimensions, weight and other parameters discussed herein are examples and, more specifically, are examples based on pelletized fuel having a composite fuel composition including 89-91% BeO, 8.5-10.5% $UO_2$, and 0.25-1.0% $CeO_2$, and wherein the $UO_2$ includes 88-92% enriched U-235 and the balance is U-234 and U-238. Depending on fuel, moderator, and cladding materials, different temperature limits and different energy production ranges may be realized. Further, different fuel compositions are contemplated, such as compositions including UCO TRISO, $UO_2$ TRISO, U-metal, $UO_2$, UN, and other nuclear fuel (hafnium, thorium, plutonium, etc.) all with potential for moderator mixing. Additionally, variations of fuel rods in which liquid metal is incorporated into the fuel rod as in-fill and to promote thermal conductivity between the fuel and the cladding of the fuel rod are also contemplated. Suitable liquid metals for inclusion in the disclosed fission reactor and to be included in the fuel cavity include sodium (Na), sodium-potassium (NaK), potassium (K), iron (Fe), copper (Cu), lead-bismuth (Pb-Bi), tin-lead (Sn—Pb), and tin (Sn). Different metals and alloys can be suitably used depending on the cladding/fuel combination. See also, U.S. application Ser. No. 16/851,142, the content of each of these applications are incorporated herein by reference.

Also, the control material that can be incorporated into the design to provide neutronics and controls. Such other materials include Iridium Alloys (preferred), Hafnium Alloys, Silver/Indium/Cadmium Alloys, Europium, and Tantalum. Structures, such as control curtains or rods, can be made from one or more or a combination of these alloys and can be located at suitable locations in the reactor core, such as the auxiliary ports or between the reactor core and reflector. Rods of desired material will be optimized for control methods depending on inserted target material, and curtains will be outfitted with neutron absorption material in specific locations to optimize longevity and shutdown/start-up routines.

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to fissionable fuel materials, nuclear reactors, and associated components, the principles, compositions, structures, features, arrangements and processes described herein can also apply to other materials, other compositions, other structures, other features, other arrangements and other processes as well as to their manufacture and to other reactor types.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapped, interweaved, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A reactor core of a thermal neutron fission reactor, comprising:
    a plurality of fuel rods extending parallel to a longitudinally extending central axis of the reactor core, each fuel rod including a composite fuel composition enclosed within a primary containment barrier, wherein the primary containment barrier comprises a seamless cladding tube, a first end cap, and a second end cap;
    a first end plate located at a first longitudinal end of the reactor core, the first end plate including a plurality of openings extending across a thickness of the first end plate from a first side to a second side of the first end plate, wherein each of the plurality of fuel rods is attached to the first end plate by a first interfacing structure;
    a second end plate located at a second longitudinal end of the reactor core, the second end plate including a plurality of openings extending across a thickness of the second end plate from a first side to a second side of the second end plate, wherein each of the plurality of fuel rods is attached to the second end plate by a second interfacing structure; and
    a plurality of intermediate support plates located along a longitudinal length of the reactor core between the first longitudinal end and the second longitudinal end, each intermediate support plate including a plurality of openings extending across a thickness of the respective intermediate support plate from a first side to a second side of the respective intermediate support plate, wherein each of the plurality of fuel rods is attached to each intermediate support plate,
    wherein, in a plane perpendicular to the longitudinally extending central axis of the reactor core, the plurality of fuel rods are arranged at nodes of a hexagonal pitch arrangement,
    wherein the nodes are in a spaced-apart arrangement with the openings between the nodes, the openings forming part of a flow path through the reactor core extending from the first end plate to the second end plate, and
    wherein at least two of the nodes of the hexagonal pitch arrangement are sized to allow insertion, translation, removal, or a combination thereof of auxiliary equipment.

2. The reactor core according to claim 1, wherein the auxiliary equipment includes a control rod or a target delivery system for isotopes.

3. The reactor core according to claim 1, wherein the composite fuel composition includes 89-91% BeO, 8.5-10.5% $UO_2$, and 0.25-1.0% $CeO_2$, and wherein the uranium in the $UO_2$ includes 80-95% enriched U-235 and the balance is U-234 and U-238.

4. The reactor core according to claim 1, wherein the composite fuel composition includes 90% BeO, 9.5% $UO_2$, and 0.5% $CeO_2$, and wherein the uranium in the $UO_2$ includes 90% enriched U-235 and the balance is U-234 and U-238.

5. The reactor core according to claim 1, wherein the composite fuel composition has a shape of a cylindrical fuel pellet and a plurality of cylindrical fuel pellets are axially stacked within the seamless cladding tube.

6. The reactor core according to claim 5, wherein the composite fuel composition in the cylindrical fuel pellet is volumetrically homogeneous.

7. The reactor core according to claim 1, wherein the first end cap and the second end cap are welded to the seamless cladding tube.

8. The reactor core according to claim 1, wherein a composition of the first end plate, a composition of the second end plate, and a composition of the plurality of intermediate support plates are each an aluminum alloy or a zirconium alloy.

9. The reactor core according to claim 8, wherein a composition of the first end plate, a composition of the second end plate, and a composition of the plurality of intermediate support plates are each an aluminum alloy.

10. The reactor core according to claim 1, wherein a composition of the seamless cladding tube is an aluminum alloy or a zirconium alloy.

11. The reactor core according to claim 10, wherein a composition of the seamless cladding tube is an aluminum alloy.

12. The reactor core according to claim 1, wherein each of the plurality of fuel rods is attached to each intermediate support plate by a weld or by a diffusion bond.

13. The reactor core according to claim 1, wherein the first interfacing structure includes a threaded nut or direct threading between a respective fuel rod and the first end plate.

14. The reactor core according to claim 13, wherein the second interfacing structure includes a threaded nut or direct threading between a respective fuel rod and the second end plate.

15. A thermal neutron fission reactor, comprising:
a pressure vessel defining an interior volume;
an active core region located within the interior volume of the pressure vessel, the active core region including the reactor core according to claim 1 and a reflector,
wherein relative to the longitudinally extending central axis of the reactor core, the reflector is radially outward of the reactor core.

16. The thermal neutron fission reactor according to claim 15, further comprising a plurality of control rods insertable in the nodes of the hexagonal pitch arrangement sized to allow translation of the control rod.

17. The thermal neutron fission reactor according to claim 15, wherein the pressure vessel is manufactured from stainless steel.

18. The thermal neutron fission reactor according to claim 15, further comprising braces attached to an inner surface of the pressure vessel, wherein a first brace is connected to the first end plate and a second brace is connected to the second end plate.

19. The thermal neutron fission reactor according to claim 15, further comprising at least one target delivery system for isotopes, the at least one target delivery system for isotopes insertable into and removable from the nodes of the hexagonal pitch arrangement sized to allow insertion and removal of the target delivery system for isotopes.

20. The thermal neutron fission reactor according to claim 19, wherein the pressure vessel includes sealable openings positioned to provide access to the target delivery system.

21. A method to prepare a radioisotope, the method comprising:
placing a volume of material into one of the target delivery system for isotopes of the thermal neutron fission reactor according to claim 19;
inserting the target delivery system for isotopes into one of the nodes of the hexagonal pitch arrangement sized to allow insertion and removal of the target delivery system for isotopes;
irradiating the target delivery system for isotopes with radiation from the thermal neutron fission reactor; and
recovering the irradiated volume of material.

* * * * *